United States Patent
Zhou et al.

(10) Patent No.: US 12,190,878 B2
(45) Date of Patent: Jan. 7, 2025

(54) VOICE INTERACTION METHOD AND APPARATUS

(71) Applicant: Huawei Technologies Co., Ltd., Shenzhen (CN)

(72) Inventors: Yuxiao Zhou, Shanghai (CN); Ping Song, Shanghai (CN); Chunliang Liu, Shanghai (CN); Chao Liang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 329 days.

(21) Appl. No.: 17/707,666

(22) Filed: Mar. 29, 2022

(65) Prior Publication Data

US 2022/0223154 A1    Jul. 14, 2022

Related U.S. Application Data

(63) Continuation of application No. PCT/CN2020/118748, filed on Sep. 29, 2020.

(30) Foreign Application Priority Data

Sep. 30, 2019  (CN) .......................... 201910941167.0

(51) Int. Cl.
  *G10L 15/22*   (2006.01)
  *G06F 3/16*    (2006.01)
  *G10L 15/30*   (2013.01)

(52) U.S. Cl.
  CPC .............. *G10L 15/22* (2013.01); *G06F 3/165* (2013.01); *G10L 15/30* (2013.01);
  (Continued)

(58) Field of Classification Search
  USPC .................................................... 704/1–504
  See application file for complete search history.

(56) References Cited

U.S. PATENT DOCUMENTS

| 9,691,115 | B2 * | 6/2017 | Abramson | ...... H04M 1/724098 |
| 9,842,299 | B2 * | 12/2017 | Stolarz | ...................... G06F 3/01 |
| 10,950,228 | B1 * | 3/2021 | Tan | ......................... G06F 3/167 |
| 2012/0198488 | A1 | 8/2012 | Son et al. | |

(Continued)

FOREIGN PATENT DOCUMENTS

| CN | 108470034 A | 8/2018 |
| CN | 109584879 A | 4/2019 |

(Continued)

OTHER PUBLICATIONS

"Library Development and Construction of Harmonious Society," Chinese Library Society, Total 1 page (abstract) (Apr. 2007).

(Continued)

*Primary Examiner* — Marcus T Riley
(74) *Attorney, Agent, or Firm* — Leydig, Voit & Mayer, Ltd.

(57) ABSTRACT

Embodiments provide a voice interaction method and an apparatus, and relate to the field of terminal technologies. Common voice skill commands in a first application scenario may be determined based on the first application scenario and a historical voice skill usage record, and displayed in a display interface. This can implement scenario-based recommendation of voice skill commands, to cover as many application scenarios as possible. In this application, after being woken up, the voice assistant determines the first application scenario based on one or more information items. The voice assistant determines the common voice skill commands in the first application scenario based on the first application scenario and the historical voice skill usage record. The voice assistant displays the common voice skill commands in the first application scenario in the display interface.

20 Claims, 19 Drawing Sheets

(52) U.S. Cl.
CPC .................. *G10L 2015/223* (2013.01); *G10L 2015/225* (2013.01); *G10L 2015/228* (2013.01)

(56) References Cited

U.S. PATENT DOCUMENTS

| | | | |
|---|---|---|---|
| 2013/0275875 A1* | 10/2013 | Gruber | G06F 3/167 |
| | | | 715/728 |
| 2013/0278492 A1* | 10/2013 | Stolarz | G06F 16/245 |
| | | | 345/156 |
| 2013/0344859 A1* | 12/2013 | Abramson | H04M 1/724098 |
| | | | 455/418 |
| 2015/0229510 A1 | 8/2015 | Rao et al. | |
| 2015/0254057 A1 | 9/2015 | Klein et al. | |
| 2016/0111088 A1 | 4/2016 | Park | |
| 2016/0205076 A1 | 7/2016 | Shimizu | |
| 2017/0097618 A1 | 4/2017 | Cipollo et al. | |
| 2017/0110129 A1 | 4/2017 | Gelfenbeyn et al. | |
| 2017/0302785 A1* | 10/2017 | Abramson | H04M 1/72454 |
| 2018/0075364 A1* | 3/2018 | Stolarz | G06F 16/245 |
| 2018/0190264 A1* | 7/2018 | Mixter | G10L 15/22 |
| 2018/0278740 A1 | 9/2018 | Choi et al. | |
| 2019/0042601 A1 | 2/2019 | Ashe | |
| 2022/0223154 A1* | 7/2022 | Zhou | G10L 15/30 |

FOREIGN PATENT DOCUMENTS

| | | | | |
|---|---|---|---|---|
| CN | 109829107 A | | 5/2019 | |
| CN | 110012151 A | | 7/2019 | |
| CN | 110138959 A | | 8/2019 | |
| CN | 110164427 A | | 8/2019 | |
| CN | 110175012 A | | 8/2019 | |
| EP | 1102177 A2 | | 5/2001 | |
| EP | 4030422 A1 | * | 7/2022 | ............. G06F 3/165 |
| JP | 2010128144 A | | 6/2010 | |
| WO | WO-2013190380 A2 | * | 12/2013 | ......... G01C 21/3407 |
| WO | WO-2015027248 A2 | * | 2/2015 | ............. G01C 21/34 |
| WO | 2017173141 A1 | | 10/2017 | |
| WO | WO-2021063343 A1 | * | 4/2021 | ............. G06F 3/165 |

OTHER PUBLICATIONS

Li Lingqi, "Young Eagle Test Wings," Total 20 pages (Feb. 2017). With an English abstract.

Zhang Yihao, "Research on Personalized Recommendation Based on Semi-supervised Learning," Total 13 pages (Nov. 2014).With an English abstract.

* cited by examiner

VOICE INTERACTION METHOD AND APPARATUS

CROSS-REFERENCE TO RELATED APPLICATION

This application is a continuation of international Patent Application No. PCT/CN2020/118748, filed on Sep. 29, 2020, which claims priority to Chinese Patent Application No. 201910941167.0, filed on Sep. 30, 2019. The disclosures of the aforementioned applications are hereby incorporated by reference in their entireties.

TECHNICAL FIELD

This application relates to the field of terminal technologies, and in particular, to a voice interaction method and an apparatus.

BACKGROUND

With increasingly mature voice interaction technologies, an application (APP) such as a voice assistant is installed on more electronic devices to implement voice interaction between the electronic devices and users. Usually, a developer connects the voice assistant and various services in the electronic device through a dialog development platform, so that the voice assistant can invoke the various services in the electronic device through the dialog development platform and voice skill commands. The dialog development platform is a voice skill development tool provided for the developer, for example, Google dialogflow. The voice skill is a service implemented by the voice assistant by invoking the various services in the electronic device, and each voice skill needs to be invoked by a specific voice skill command. When developing a voice skill on the dialog development platform, the developer manually configures a voice skill command on each dialog node. When a user encounters a dialog node during voice interaction, a corresponding voice skill command is displayed in an interface. Therefore, in the conventional technology, a voice skill command that can be invoked by each dialog node is fixed and covers limited scenarios.

SUMMARY

This application provides a voice interaction method and an apparatus. Common voice skill commands in a first application scenario are displayed in a display interface based on a historical voice skill usage record of a user and the first application scenario. That is, a voice skill command that may be entered by the user in the first application scenario is recommended to the user. This implements scenario-based recommendation of voice skill commands, to cover as many application scenarios as possible.

To achieve the foregoing objectives, the following technical solutions are used in this application.

According to a first aspect, this application provides a voice interaction method, used in an electronic device. A voice assistant is installed on the electronic device, and the method includes: After being woken up, the voice assistant determines a first application scenario based on one or more information items. The information item includes a current display interface of the electronic device, a current moment, a current location of the electronic device, a current motion state of the electronic device, a current event, or an application currently running on the electronic device. Then, the voice assistant determines common voice skill commands in the first application scenario based on the first application scenario and a historical voice skill usage record. The voice skill command is used to invoke a voice skill, the voice skill is a service provided by the voice assistant, the historical voice skill usage record includes one or more records, and the record is used to indicate time for invoking a voice skill, a voice skill command for invoking a voice skill, and an application scenario for invoking a voice skill. Finally, the voice assistant displays the common voice skill commands in the first application scenario in a display interface.

In embodiments of this application, the voice assistant determines the one or more information items in the first application scenario according to an application identification mechanism of the electronic device. Further, the voice assistant determines the common voice skill commands in the first application scenario based on the information item in the first application scenario and the application scenario for invoking a voice skill in the historical voice skill usage record. More information items in the first application scenario indicate that more factors are considered when the voice assistant determines the common voice skill commands in the first application scenario, and the common voice skill commands determined by the voice assistant are more practical and accurate. In addition, the common voice skill commands displayed in the display interface are determined based on the first application scenario and the voice skill usage record, so that voice skill commands recommended to the user can be dynamically adjusted, to cover as many application scenarios as possible. After determining the common voice skill commands, the voice assistant further displays the common voice skill commands in the display interface. Therefore, the voice assistant can implement scenario-based recommendation of voice skill commands, so that the user can invoke a voice skill based on the voice skill commands displayed in the display interface. This reduces cases in which the voice assistant fails to recognize a voice skill command entered by the user due to an incorrect input by the user, or the voice assistant fails to invoke a voice skill based on a voice skill command entered by the user, and enhances interaction experience between the user and the voice assistant.

In an embodiment, when the voice assistant is woken up for the first time, the method further includes: If a current user is a new user, a network connection is normal, and the voice assistant can normally obtain high-frequency voice skill commands in a current network, the voice assistant displays the high-frequency voice skill commands in the display interface. If the current user is an old user, the voice assistant determines common voice skill commands of the current user based on the historical voice skill usage record, and the voice assistant displays the common voice skill commands of the current user in the display interface. If a network connection is abnormal, the voice assistant notifies a user that a network is abnormal, and displays, in the display interface, voice skill commands to open network system settings. If the voice assistant cannot normally obtain the high-frequency voice skills in the current network, the voice assistant displays preset voice skill commands in the display interface.

According to the foregoing process, after the voice assistant is woken up for the first time, the voice assistant may recommend, to the user based on a current user type, a current network connection status, and whether the voice assistant can normally obtain the high-frequency voice skill commands in the current network, voice skill commands that may be used by the user, to implement scenario-based recommendation of voice skill commands. This reduces cases in which the user incorrectly enters a voice skill command or the voice assistant cannot invoke a voice skill based on a voice skill command entered by the user, and enhances interaction experience between the user and the voice assistant.

In an embodiment, after the voice assistant determines the common voice skill commands in the first application scenario based on the first application scenario and the historical voice skill usage record, the method further includes: The voice assistant determines appearance frequency of common voice skills in the first application scenario based on the historical voice skill usage record and the first application scenario, where the common voice skills correspond to the common voice skill commands. The voice assistant determines priorities of the common voice skills based on appearance frequency of the common voice skill commands in the first application scenario. The voice assistant determines locations of the common voice skill commands in the display interface based on the priorities of the common voice skills.

According to the foregoing process, the voice assistant may determine the priorities of the common voice skill commands in the first application scenario based on the application scenario for invoking a voice skill in the historical voice skill usage record, a quantity of times a voice skill is invoked, and the first application scenario. In this way, the voice assistant can determine, based on priorities of the common voice skills, display locations and a display order of the common voice skills in the display interface, and a voice skill command with a higher priority is preferentially displayed in the display interface.

In an embodiment, the voice interaction method further includes: In response to a voice skill command entered by the user, the voice assistant invokes a voice skill corresponding to the voice skill command entered by the user.

In an embodiment, the voice interaction method further includes: When failing to invoke the voice skill, the voice assistant re-determines common voice skill commands in the first application scenario based on the time for invoking a voice skill in the historical voice skill usage record, and displays the common voice skill commands in the display interface.

According to the foregoing process, scenario-based recommendation of voice skill commands can be implemented, the voice skill commands can be dynamically adjusted, and application scenarios can be covered as many as possible.

In an embodiment, the voice interaction method further includes: If the voice assistant does not receive, within a first preset time period, a voice skill command entered by the user, the voice assistant determines a second application scenario. The voice assistant determines common voice skill commands in the second application scenario based on the second application scenario and a historical voice skill usage record. Then, the voice assistant displays the common voice skill commands in the second application scenario in the display interface.

In an embodiment, the voice interaction method further includes: The voice assistant is closed if the voice assistant does not receive, within a second preset time period, a voice skill command entered by the user.

According to the foregoing process, less resources are wasted when the voice assistant is opened due to an accidental touch by the user.

In an embodiment, the voice interaction method further includes: If a network connection is abnormal, the voice assistant notifies the user that a network is abnormal, and displays, in the display interface, the voice skill commands to open the network system settings.

In an embodiment, in the voice interaction method, the common voice skill command is used to invoke a voice skill corresponding to a clickable control in the display interface; and/or the common voice skill command is used to invoke a voice skill corresponding to recognizable text or a recognizable picture in the display interface; and/or the common voice skill command is used to invoke a voice skill corresponding to a recognizable scenario intention in the display interface; and/or the common voice skill command is used to invoke a voice skill corresponding to regular behavior that is based on the current moment; and/or the common voice skill command is used to invoke a voice skill corresponding to regular behavior that is based on the current location of the electronic device; and/or the common voice skill command is used to invoke a voice skill corresponding to regular behavior that is based on the current motion state of the electronic device; and/or the common voice skill command is used to invoke a voice skill corresponding to a native application; and/or the common voice skill command is used to invoke a voice skill corresponding to a third-party application; and/or the common voice skill command is used to invoke a voice skill corresponding to a preset event; and/or the common voice skill command is used to invoke a voice skill corresponding to an operation related to a plurality of applications; and/or the common voice skill command is used to invoke a voice skill corresponding to an operation with a long path; and/or the common voice skill command is used to invoke a voice skill corresponding to a function in the application currently running on the electronic device.

In an embodiment, the voice assistant is displayed in half-screen mode, the half-screen mode means that a ratio of an application interface of the voice assistant to an entire display interface of the electronic device is greater than 0 and less than 1. The method includes: The voice assistant displays a feedback result of a voice skill command in a user interface of the voice assistant. The voice assistant shares the feedback result of the voice skill command with another application in response to an operation command of the user.

In an embodiment, that the voice assistant displays a feedback result of a voice skill command in a user interface of the voice assistant includes: The voice assistant displays the feedback result in the user interface of the voice assistant in a form of a card. That the voice assistant shares the feedback result of the voice skill command with another application in response to an operation command of the user includes: The voice assistant selects the card in response to a press operation performed by the user on the card. In response to a drag operation performed by the user on the card, the voice assistant drags the card from the user interface of the voice assistant to a user interface of the another application.

According to a second aspect, embodiments of this application provide an electronic device, and a voice assistant is installed on the electronic device. The electronic device includes a processor, a memory, and a display, and the memory and the display are coupled to the processor. The display is configured to display an image generated by the processor, the memory is configured to store computer program code, the computer program code includes computer instructions, and when the processor executes the computer instructions, the processor is configured to: after the voice assistant is woken up, determine a first application scenario based on one or more information items. The information item includes a current display interface of the electronic device, a current moment, a current location of the electronic device, a current motion state of the electronic device, a current event, or an application currently running on the electronic device. The processor is configured to determine common voice skill commands in the first application scenario based on the first application scenario and a historical voice skill usage record. The voice skill command is used to invoke a voice skill, the voice skill is a service provided by the voice assistant, the historical voice skill usage record includes one or more records, and the record is used to indicate time for invoking a voice skill, a voice skill command for invoking a voice skill, and an application scenario for invoking a voice skill. The processor is further configured to display the common voice skill commands in the first application scenario in a display interface.

In an embodiment, when the voice assistant is woken up for the first time, the processor is further configured to: if a current user is a new user, a network connection is normal, and the voice assistant can normally obtain high-frequency voice skill commands in a current network, display, by the voice assistant, the high-frequency voice skill commands in the display interface. If the current user is an old user, the voice assistant determines common voice skill commands of the current user based on the historical voice skill usage record, and the voice assistant displays the common voice skill commands of the current user in the display interface. If a network connection is abnormal, the voice assistant notifies a user that a network is abnormal, and displays, in the display interface, voice skill commands to open network system settings. If the voice assistant cannot normally obtain the high-frequency voice skills in the current network, the voice assistant displays preset voice skill commands in the display interface.

In an embodiment, after the processor is configured to determine the common voice skill commands in the first application scenario based on the first application scenario and the historical voice skill usage record, the processor is further configured to determine appearance frequency of common voice skills in the first application scenario based on the historical voice skill usage record and the first application scenario, where the common voice skills correspond to the common voice skill commands. The processor is further configured to determine priorities of the common voice skills based on appearance frequency of the common voice skill commands in the first application scenario. The processor is further configured to determine locations of the common voice skill commands in the display interface based on the priorities of the common voice skills.

In an embodiment, the processor is further configured to: in response to a voice skill command entered by the user, invoke a voice skill corresponding to the voice skill command entered by the user.

In an embodiment, the processor is further configured to: when failing to invoke the voice skill, re-determine common voice skill commands in the first application scenario based on the time for invoking a voice skill in the historical voice skill usage record, and display the common voice skill commands in the display interface.

In an embodiment, the processor is further configured to: if the voice assistant does not receive, within a first preset time period, a voice skill command entered by the user, determine, by the voice assistant, a second application scenario. The voice assistant determines common voice skill commands in the second application scenario based on the second application scenario and a historical voice skill usage record. The voice assistant displays the common voice skill commands in the second application scenario in the display interface.

In an embodiment, the processor is further configured to close the voice assistant if the voice assistant does not receive, within a second preset time period, a voice skill command entered by the user.

In an embodiment, the processor is further configured to: if a network connection is abnormal, notify, by the voice assistant, the user that a network is abnormal, and display, in the display interface, the voice skill commands to open the network system settings.

In an embodiment, the common voice skill command is used to invoke a voice skill corresponding to a clickable control in the display interface; and/or the common voice skill command is used to invoke a voice skill corresponding to recognizable text or a recognizable picture in the display interface; and/or the common voice skill command is used to invoke a voice skill corresponding to a recognizable scenario intention in the display interface; and/or the common voice skill command is used to invoke a voice skill corresponding to regular behavior that is based on the current moment; and/or the common voice skill command is used to invoke a voice skill corresponding to regular behavior that is based on the current location of the electronic device; and/or the common voice skill command is used to invoke a voice skill corresponding to regular behavior that is based on the current motion state of the electronic device; and/or the common voice skill command is used to invoke a voice skill corresponding to a native application; and/or the common voice skill command is used to invoke a voice skill corresponding to a third-party application; and/or the common voice skill command is used to invoke a voice skill corresponding to a preset event; and/or the common voice skill command is used to invoke a voice skill corresponding to an operation related to a plurality of applications; and/or the common voice skill command is used to invoke a voice skill corresponding to an operation with a long path; and/or the common voice skill command is used to invoke a voice skill corresponding to a function in the application currently running on the electronic device.

In an embodiment, the voice assistant is displayed in half-screen mode, and the half-screen mode means that a ratio of the application interface of the voice assistant to an entire display interface of the electronic device is greater than 0 and less than 1; and the processor is further configured to display a feedback result of a voice skill command in a user interface of the voice assistant, and share, by the voice assistant, the feedback result of the voice skill command with another application in response to an operation command of the user.

In an embodiment, that the processor is configured to display a feedback result of a voice skill command in a user interface of the voice assistant is specifically: The processor is configured to display, by the voice assistant, the feedback result in the user interface of the voice assistant in a form of a card. That the voice assistant shares the feedback result of the voice skill command with another application in response to an operation command of the user is specifically: The processor is configured to: in response to a press operation performed by the user on the card, select, by the voice assistant, the card; and in response to a drag operation performed by the user on the card, drag, by the voice assistant, the card from the user interface of the voice assistant to a user interface of the another application.

According to a third aspect, embodiments of this application provide a computer storage medium. The computer storage medium includes computer instructions, and when the computer instructions are run on an electronic device, the electronic device is enabled to perform the voice interaction method according to any one of the first aspect and the possible implementations of the first aspect.

According to a fourth aspect, embodiments of this application provide a computer program product. When the computer program product is run on a computer, the computer is enabled to perform the voice interaction method according to any one of the first aspect and the possible implementations of the first aspect.

According to a fifth aspect, a chip system is provided, and includes a processor. When the processor executes instructions, the processor is enabled to perform the voice interaction method according to any one of the first aspect and the possible implementations of the first aspect.

In addition, for technical effects brought by the electronic device according to any one of the second aspect and the design manners of the second aspect, the computer storage medium according to the third aspect, and the computer program product according to the fourth aspect, refer to the technical effects brought by the first aspect and the different design manners of the first aspect. Details are not described herein again.

DESCRIPTION OF EMBODIMENTS

The following describes embodiments of this application in detail with reference to accompanying drawings.

Embodiments of this application provide a voice interaction method and an apparatus, which may be used in an electronic device, to implement voice interaction between the electronic device and a user through a voice assistant on the electronic device. The voice assistant determines, according to an application recognition mechanism on the electronic device, first application scenario information including one or more information items (the information item includes a current moment, a current location of the electronic device, a current display interface of the electronic device, and the like). The voice assistant determines a priority sequence of common voice skill commands based on the first application scenario information and a historical voice skill usage record, and displays common voice skill commands in a first application scenario in a display interface according to priorities. The voice assistant recommends voice skill commands to a user to implement scenario-based recommendation of voice skill commands. In addition, the voice assistant on the electronic device records a voice skill command sent by the user and current scenario information as a data source for determining the user's possible intention of using the voice assistant, to cover as many application scenarios of voice skill commands as possible, and improve user experience.

The voice assistant may be an application installed on the electronic device. The application may be an embedded application on the electronic device (namely, a system application on the electronic device) or a downloadable application. The embedded application is an application provided as a part of the electronic device (for example, a mobile phone). For example, the embedded application may be "Settings", "Messages", or "Camera". The downloadable application is an application that can provide an internet protocol multimedia subsystem (IMS) connection of the downloadable application. The downloadable application may be an application pre-installed on the electronic device or a third-party application that is downloaded by the user and installed on the electronic device. For example, the downloadable application may be "WeChat", "Alipay", or "Email".

The electronic device in embodiments of this application may be a portable computer (for example, a mobile phone), a notebook computer, a personal computer (PC), a wearable electronic device (for example, a smart watch), a tablet computer, a smart home device, or an augmented reality (AR) device/a virtual reality (VR) device, an artificial intelligence (AI) terminal (for example, an intelligent robot), a vehicle-mounted computer, and the like. A specific form of the device is not specifically limited in the following embodiments.

Figure 1:
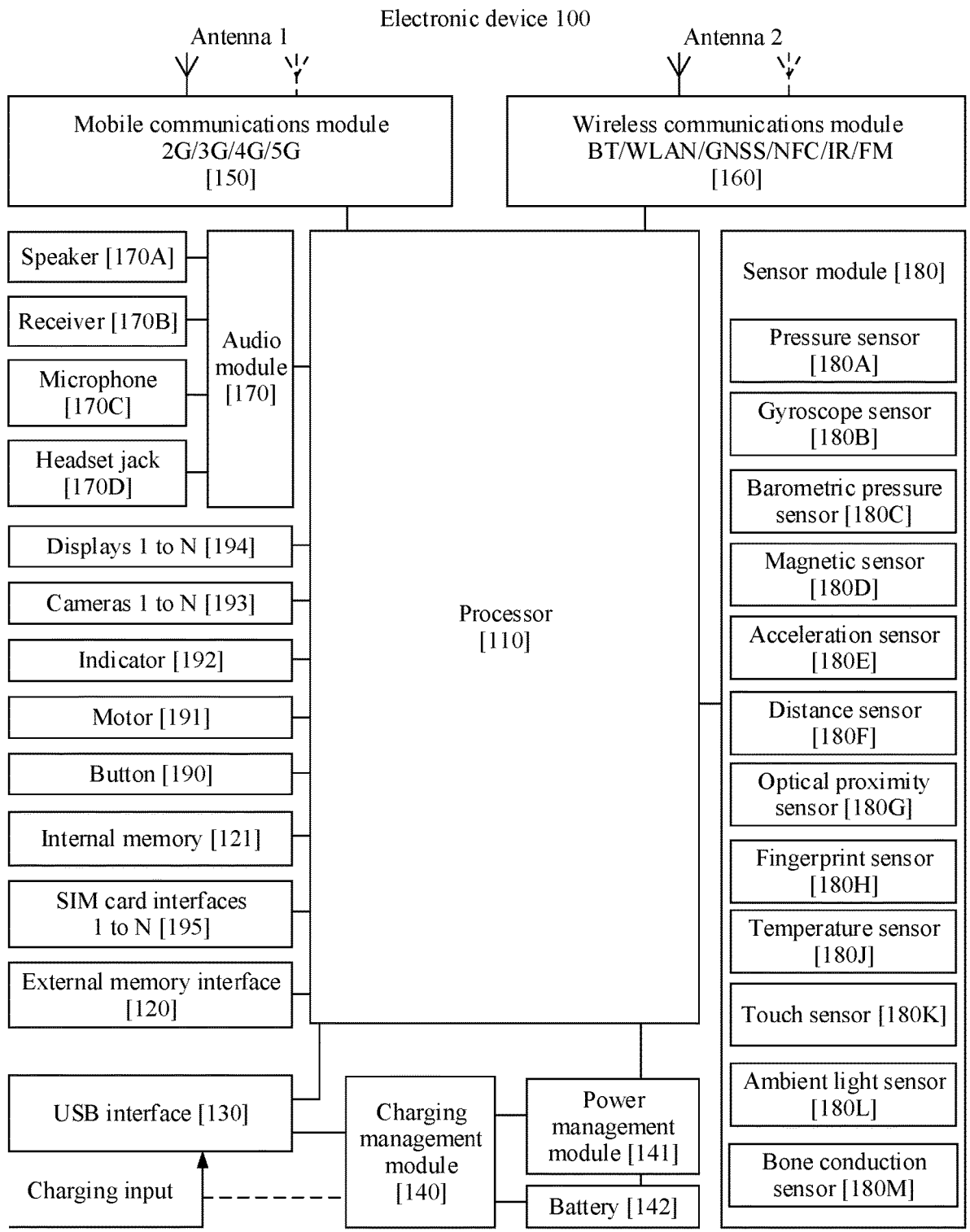
FIG. 1 is a schematic diagram 1 of a structure of an electronic device according to an embodiment of this application.

FIG. 1 is a schematic diagram of a structure of an electronic device 100 according to an embodiment of this application. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in embodiments does not constitute a specific limitation on the electronic device 100. In some other embodiments, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

In embodiments of this application, the DSP may monitor voice data in real time. When similarity between the voice data detected by the DSP and a voice skill command recommended by a voice assistant on the electronic device meets a preset condition, the DSP may deliver the voice data to the AP. The AP performs text verification and voiceprint verification on the voice data. When the AP determines that the voice data matches the voice skill command recommended by the voice assistant, the electronic device may invoke the voice skill command to execute a corresponding voice skill.

The controller may be a nerve center and a command center of the electronic device 100. The controller may generate an operation control signal based on an instruction operation code and a time sequence signal, to control to read instructions and execute instructions.

A memory may be further disposed in the processor 110, and is configured to store instructions and data. In some embodiments, the memory in the processor 110 is a cache. The memory may store instructions or data that has just been used or is cyclically used by the processor 110. If the processor 110 needs to use the instructions or the data again, the processor may directly invoke the instructions or the data from the memory. This avoids repeated access and reduces waiting time of the processor 110. Therefore, system efficiency is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call by using a Bluetooth headset.

The PCM interface may also be configured to perform audio communication, and sample, quantize, and code an analog signal. In some embodiments, the audio module 170 may be coupled to the wireless communications module 160 through a PCM bus interface. In some embodiments, the audio module 170 may alternatively transfer an audio signal to the wireless communications module 160 through the PCM interface, to implement a function of answering a call by using the Bluetooth headset. Both the I2S interface and the PCM interface may be configured to perform the audio communication.

The UART interface is a universal serial data bus, and is configured to perform asynchronous communication. The bus may be a two-way communications bus. The bus switches to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music by using the Bluetooth headset.

The MIPI interface may be configured to connect the processor 110 to a peripheral component such as the display 194 or the camera 193. The MIPI interface includes a camera serial interface (CSI), a display serial interface (DSI), or the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as an I2C interface, an I2S interface, a UART interface, an MIPI interface, or the like.

The USB interface 130 is an interface that complies with a USB standard specification, and may be specifically a mini USB interface, a micro USB interface, a USB Type-C interface, or the like. The USB interface 130 may be configured to connect to a charger to charge the electronic device 100, or may be configured to transmit data between the electronic device 100 and a peripheral device, or may be configured to connect to a headset, to play audio by using the headset. The interface may be further configured to connect to another electronic device such as an AR device.

It may be understood that an interface connection relationship between the modules shown in embodiments of the present invention is merely used as an example for description, and does not constitute a limitation on the structure of the electronic device 100. In some other embodiments, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments in which wired charging is used, the charging management module 140 may receive a charging input from the wired charger through the USB interface 130. In some embodiments in which wireless charging is used, the charging management module 140 may receive a wireless charging input through a wireless charging coil of the electronic device 100.

The charging management module 140 may further supply power to the electronic device by using the power management module 141 when the battery 142 is charged.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

The mobile communications module 150 may provide a solution that is for wireless communication including 2G/3G/4G/5G and the like and that is applied to the electronic device 100. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transfer a processed electromagnetic wave to the modem processor for demodulation. The mobile communications module 150 may further amplify a signal modulated by the modem processor, and convert the signal to an electromagnetic wave for radiation through the antenna 1. In some embodiments, at least some function modules of the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits a processed signal to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device as the mobile communications module 150 or another function module.

The wireless communications module 160 may provide a wireless communication solution that is applied to the electronic device 100 and that includes wireless local area networks (WLAN) (for example, a wireless fidelity (-Fi) network), Bluetooth (BT), a global navigation satellite system (GNSS), frequency modulation (FM), a near field communication (NFC) technology, and an infrared (IR) technology. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), mini LED, a micro LED, a micro OLED, a quantum dot light-emitting diode (QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of a camera through a lens. An optical signal is converted into an electrical signal. The photosensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and a color temperature of a shooting scenario. In some embodiments, the ISP may be disposed in the camera 193.

The camera 193 is configured to capture a static image or a video. An optical image of an object is generated through the lens, and is projected to the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to: compress or decompress a digital video. The electronic device 100 may support one or more video codecs. In this way, the electronic device 100 can play or record videos in a plurality of coding formats, for example, moving picture experts group (moving picture experts group, MPEG)-1, MPEG-2, MPEG-3, and MPEG-4.

The NPU is a neural-network (NN) computing processor. The NPU quickly processes input information by referring to a biological neural network structure, for example, by referring to a mode of transfer between human brain neurons, and may further continuously perform self-learning. Applications such as intelligent cognition of the electronic device 100, for example, image recognition, facial recognition, speech recognition, and text understanding, may be implemented through the NPU.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The processor 110 runs the instructions stored in the internal memory 121 to perform various function applications of the electronic device 100 and process data. The internal memory 121 may include a program storage area and a data storage area. The program storage area may store an operating system, an application required by at least one function (for example, a voice playing function or an image playing function), and the like. The data storage area may store data (for example, audio data and an address book) and the like created when the electronic device 100 is used. In addition, the internal memory 121 may include a high-speed random access memory, or may include a nonvolatile memory, for example, at least one magnetic disk storage device, a flash memory, or a universal flash storage (universal flash storage, UFS).

The electronic device 100 may implement audio functions such as music playing and recording functions by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may further be configured to code and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The receiver 170B, also referred to as an "earpiece", is configured to convert an audio electrical signal into a sound signal. When the electronic device 100 answers a call or receives voice information, the receiver 170B may be placed near a human ear to listen to a voice.

The microphone 170C, also referred to as a "mike" or a "mic", is configured to convert a sound signal into an electrical signal. When making a call, sending voice information, or needing to trigger, by using a voice assistant, the electronic device 100 to perform some functions, a user may make a sound by putting the mouth close to the microphone 170C, and input a sound signal to the microphone 170C. At least one microphone 170C may be disposed in the electronic device 100. In some other embodiments, two microphones 170C may be disposed in the electronic device 100, to implement a noise reduction function, in addition to collecting a sound signal. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be a USB interface 130, or may be a 3.5 mm open mobile terminal platform ( ) standard interface or a cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed in a same touch position but have different touch operation intensity may correspond to different operation instructions. For example, when a touch operation whose touch operation strength is less than a first pressure threshold is performed on a Messages icon, an instruction for viewing an SMS message is executed. When a touch operation whose touch operation strength is greater than or equal to the first pressure threshold is performed on the Messages icon, an instruction for creating an SMS message is executed. When a touch operation whose touch operation strength is greater than second pressure threshold acts on the Messages icon and a touch position changes, the user may drag the Messages icon to another position.

The gyroscope sensor 180B may be configured to determine a motion posture of the electronic device 100. In some embodiments, an angular velocity of the electronic device 100 around three axes (namely, axes x, y, and z) may be determined by using the gyroscope sensor 180B. The gyroscope sensor 180B may be configured to implement image stabilization during photographing. For example, when the shutter is pressed, the gyroscope sensor 180B detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyroscope sensor 180B may be further used in a navigation scenario and a motion-sensing game scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall effect sensor. The electronic device 100 may detect opening and closing of a flip cover by using the magnetic sensor 180D. In some embodiments, when the electronic device 100 is a flip phone, the electronic device 100 may detect opening and closing of a flip cover based on the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the electronic device 100, and may detect magnitude and a direction of gravity when the electronic device 100 is still. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F to implement quick focusing.

The optical proximity sensor 180G may include, for example, a light emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving.

The optical proximity sensor 180G may also be used in a leather case mode or a pocket mode to automatically unlock or lock the screen.

The ambient light sensor 180L is configured to sense ambient light luminance. The electronic device 100 may adaptively adjust brightness of the display 194 based on the sensed ambient light brightness. The ambient light sensor 180L may be further configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown due to a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor, to determine a type of a touch event. A visual output related to the touch operation may be provided on the display 194. In some other embodiments, the touch sensor 180K may alternatively be disposed on a surface of the electronic device 100 in a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may alternatively be disposed in a headset, to obtain a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch-sensitive button. The electronic device 100 may receive a button input, and generate a button signal input related to user setting and function control of the electronic device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. For touch operations performed on different areas of the display 194, the motor 191 may also correspond to different vibration feedback effects. Different application scenarios (for example, a time reminder, information receiving, an alarm clock, and a game) may also correspond to different vibration feedback effects. A touch vibration feedback effect may alternatively be customized.

The indicator 192 may be an indicator, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type, or may be of different types. The SIM card interface 195 may be compatible with different types of SIM cards. The SIM card interface 195 may also be compatible with the external storage card. The electronic device 100 interacts with a network through the SIM card, to implement functions such as calling and data communication. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. In embodiments, an Android system of the layered architecture is used as an example to describe a software structure of the electronic device 100.

Figure 2:
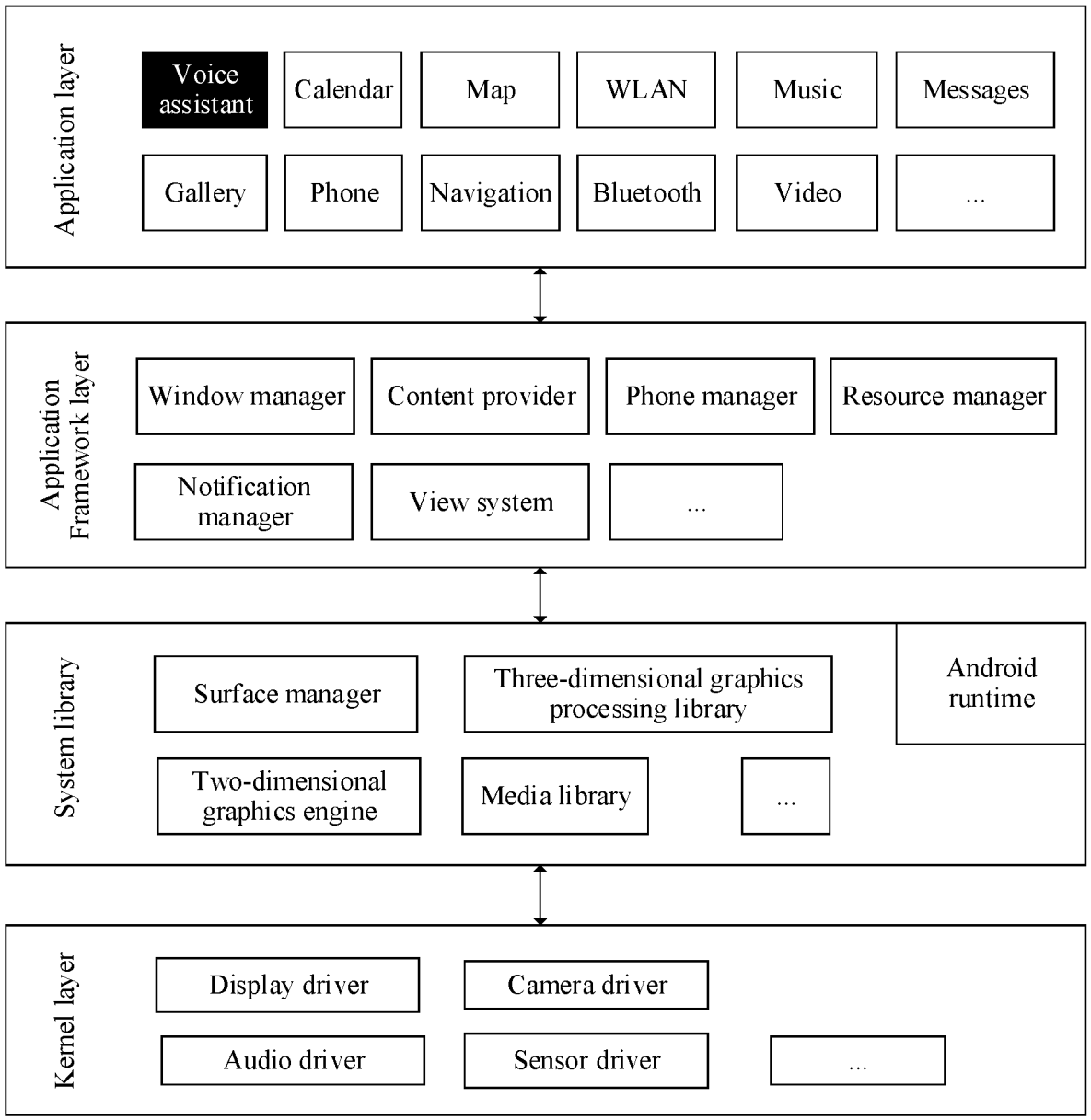
FIG. 2 is a block diagram of a software structure of an electronic device according to an embodiment of this application.

FIG. 2 is a block diagram of the software structure of the electronic device 100 according to an embodiment. In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 2, the application packages may include applications such as Voice assistant, Gallery, Calendar, Phone, Map, Navigation, WLAN, Bluetooth, Music, Video, and Messages.

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, lock a screen, take a screenshot, and the like.

The content provider is configured to store and obtain data, and enable the data to be accessed by an application. The data may include a video, an image, audio, calls that are made and received, a browsing history and a bookmark, a phone book, and the like.

The view system includes visual controls such as a control for displaying text and a control for displaying a picture. The view system may be configured to construct an application. A display interface may include one or more views. For example, a display interface including a notification icon of Messages may include a text display view and a picture display view.

The phone manager is configured to provide a communications function of the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification type message. The displayed notification information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is prompted in the status bar, a prompt tone is produced, the electronic device vibrates, or the indicator light blinks.

The Android runtime includes a kernel library and a virtual machine. The Android runtime is responsible for scheduling and management of the Android system.

The kernel library includes two parts: a function that needs to be invoked in java language and a kernel library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager, a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playing and recording of a plurality of commonly used audio and video formats, static image files, and the like. The media library may support a plurality of audio and video encoding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

For example, all technical solutions in the following embodiments may be implemented in the electronic device 100 having the foregoing hardware architecture and software architecture. With reference to the accompanying drawings and a specific application scenario, the following describes in detail the voice interaction method provided in this application by using an example in which the electronic device 100 is a mobile phone.

Figure 3:
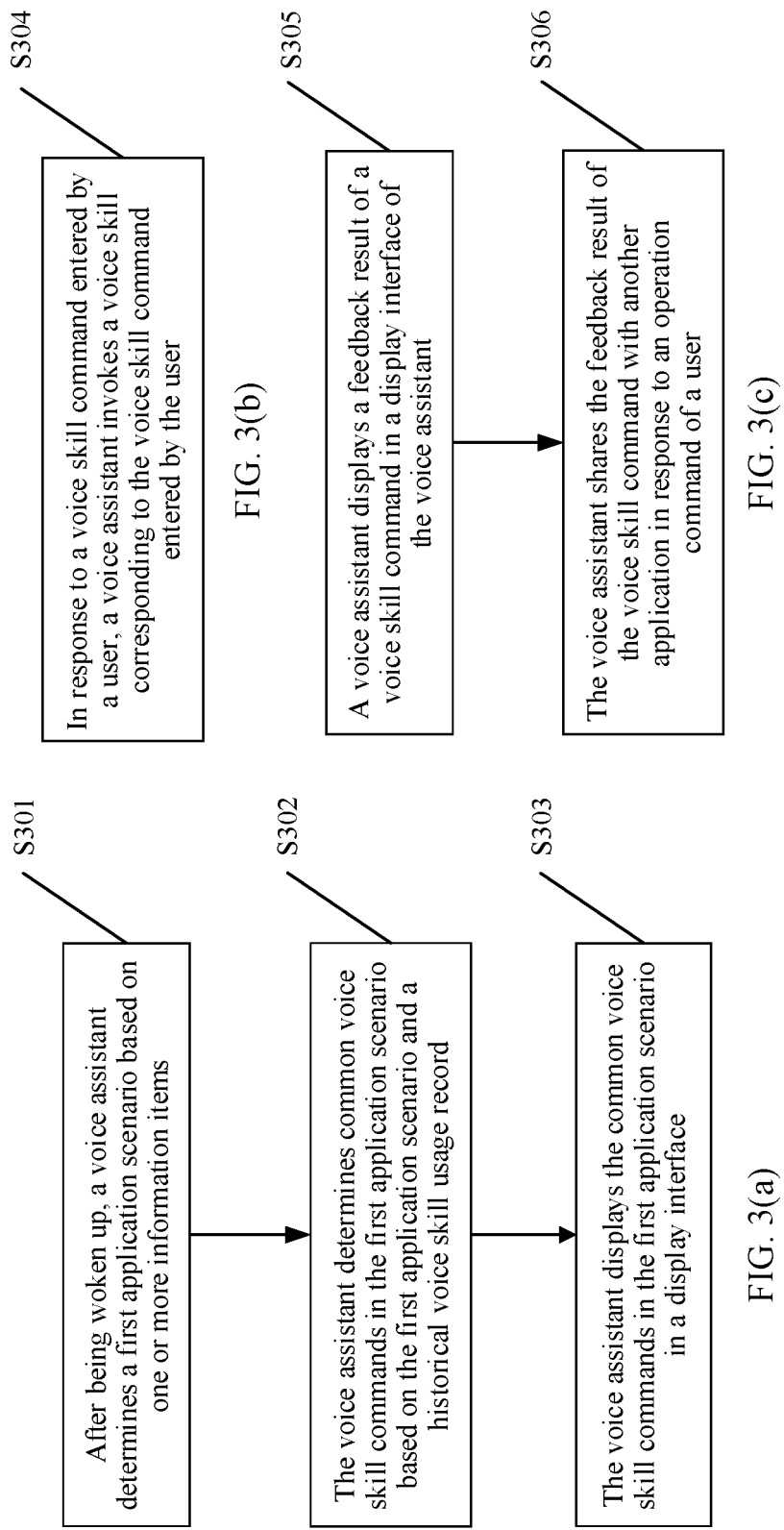
FIG. 3(a) to FIG. 3(c) are flowcharts of a voice interaction method according to an embodiment of this application.

To implement scenario-based recommendation of voice skill commands, cover as many application scenarios as possible, and enable a user to enter a correct voice skill command, an embodiment of this application provides a voice interaction method. As shown in FIG. 3(a), the method includes step S301 to step S303.

It should be noted that before step S301, a voice assistant is further woken up first. Specifically, the user may wake up the voice assistant by entering a voice keyword (for example, "Xiaoyi Xiaoyi"), or by tapping a voice assistant icon in a display interface, or pressing and holding a button on an electronic device (for example, pressing and holding a power button for 1 s). After being woken up, the voice assistant is in a sound pickup state. In this case, the voice assistant may receive a voice skill command entered by the user.

S301: After being woken up, the voice assistant determines a first application scenario based on one or more information items.

Optionally, the voice assistant obtains the one or more information items according to an application recognition mechanism of the electronic device, and further determines the first application scenario including the one or more information items. The information item includes a current display interface of the electronic device, a current moment, a current location of the electronic device, a current motion state of the electronic device, a current event, or an application currently running on the electronic device.

Based on whether the current display interface of the electronic device has recognizable text, a recognizable picture, or a recognizable scenario intention, the current display interface of the electronic device may be further classified into a display interface having no recognizable text, picture, or scenario intention, a display interface having recognizable text or a recognizable picture, and a display interface having a recognizable scenario intention (an instant messaging (IM) type). The recognizable text is valid (meaningful) text, and the recognizable picture is a valid (meaningful) picture. Specific objects such as a hotel, a scenic spot, a TV series, and a movie may be recognized from the recognizable text or picture in a display interface of the electronic device through a natural language understanding (NLU) entity recognition API or a HiTouch capability. Regarding the recognizable scenario intention, an NLU scenario recognition API recognizes information such as text and/or a picture in the current display interface to obtain structured data, and may determine a category of the obtained structured data. For example, the structured data is an address, a phone number, or a web address. In this case, a specific scenario intention such as navigating to a place, calling someone, or copying a web address can be further determined based on this information.

For example, the current motion state of the electronic device is a still state, a walking state, or a motor vehicle driving state. If the current speed and acceleration of the electronic device are both 0, the electronic device is current in the still state. That is, a motion state of the user is a still state. If the current speed or acceleration of the electronic device is greater than a first preset threshold but less than a second preset threshold, the electronic device is currently in the walking state. That is, a motion state of a user holding the electronic device is a walking state. If the current speed and/or acceleration of the electronic device are/is greater than the second preset threshold, the electronic device is currently in the motor vehicle driving state. That is, a current motion state of the user is a motor vehicle driving state. The current location of the electronic device may be a home, a company, a business center, or the like. The current moment may be a specific moment in the 24-hour system, or may be a specific time segment in a day, for example, morning, noon, evening, or night. If the current moment is 6:50 and the electronic device is at home, it may be determined that a current event is getting up.

Optionally, after the voice assistant is woken up, prompt information may be displayed via text, or prompt information may be played via voice, for example, "What can I do for you", to prompt the user to enter a voice skill command. In this way, after the voice assistant is woken up, the voice skill command entered by the user can be received as soon as possible. Alternatively, in the foregoing manner, when the voice assistant is woken up due to an accidental touch by the user, the voice assistant may remind the user that the voice assistant is opened, so that the user closes the voice assistant as soon as possible.

S302: The voice assistant determines common voice skill commands in the first application scenario based on the first application scenario and a historical voice skill usage record.

A voice skill command is used to invoke a service provided by the voice assistant, namely, a voice skill. In addition, the historical voice skill usage record includes one or more records. The one or more records indicate time at which the voice assistant invokes a voice skill, a voice skill command for invoking the voice skill, and an application scenario for invoking a voice skill in a past period of time.

There are two specific implementations of step S302: an implementation 1 and an implementation 2. The following separately describes the two implementations.

Implementation 1:

Optionally, after the voice assistant determines the first application scenario, if the application scenario for invoking a voice skill in the historical voice skill usage record includes all information items in the first application scenario, voice skills corresponding to the application scenario for invoking a voice skill are common voice skills in the first application scenario. Preset voice skill commands corresponding to the common voice skills are common voice skill commands in the first application scenario. Alternatively, in the historical voice skill usage record, voice skill commands that are most frequently used to invoke the common voice skills are common voice skill commands in the first application scenario. The preset voice skill commands are voice skill commands manually configured by a developer in a dialog development platform, and correspond to the voice skills.

For example, the first application scenario includes two information items. The two information items are an information item 1 and an information item 2. For example, the information item 1 indicates that the current moment is 10:00 a.m., and the information item 2 indicates that the current location of the electronic device is the home. There are four records in the historical voice skill usage record. The four records are a usage record of a voice skill A, a usage record of a voice skill B, a usage record of a voice skill C, and a usage record of a voice skill D. An application scenario for invoking the voice skill A includes the information item 1, an application scenario for invoking the voice skill B includes the information item 1 and the information item 2, and an application scenario for invoking the voice skill C includes the information item 1, the information item 2, and an information item 3. For example, the information item 3 indicates that the current motion state of the electronic device is the still state. An application scenario for invoking the voice skill D includes the information item 3. According to the foregoing content, the voice assistant may determine that common voice skills in the first application scenario are the voice skill B and the voice skill C, and preset voice skill commands corresponding to the voice skills B and C are common voice skill commands in the first application scenario.

Implementation 2:

When a common voice skill is determined according to the implementation 1, a quantity of common voice skills may be 0. Therefore, this embodiment of this application further provides another possible implementation: the implementation 2.

Optionally, after the voice assistant determines the first application scenario, if the application scenario for invoking a voice skill in the historical voice skill usage record includes at least one information item in the first application scenario, a voice skill corresponding to the application scenario for invoking a voice skill command is a common voice skill in the first application scenario, and a voice skill command corresponding to the common voice skill in the historical voice skill usage record is a common voice skill command in the first application scenario. In the example of the implementation 1 provided in step S302, if processing and analysis are performed according to the implementation 2, the voice assistant determines that the voice skills A, B, and C are common voice skills in the first application scenario, and voice skill commands corresponding to the voice skills A, B, and C in the historical voice skill usage record are common voice skill commands in the first application scenario.

For example, in the historical voice skill usage record, voice skill commands to invoke the voice skill A include A1, A2, and A3, and the voice skill command A1 appears more frequently than A2 and A3. Voice skill commands to invoke the voice skill B include B1, B2, and B3, and B1, B2, and B3 appear for a same quantity of times. Voice skill commands to invoke the voice skill C include C1, C2, C3, and C4, and the voice skill command C2 appears more frequently than C1, C3, and C4. Voice skill commands corresponding to the voice skill D include D1, D2, D3, D4, and D5, and the voice skill command D5 appears more frequently than D1, D2, D3, and D4. Therefore, the voice skill commands corresponding to the voice skills A, B, C, and D are A1, B1/B2/B3, C2, and D5 respectively.

It should be noted that information items in the first application scenario correspond to different common voice skill commands. The following separately describes the common voice skill commands corresponding to the information items in the first application scenario.

1. A current display interface of the electronic device having no recognizable text and/or picture or scenario intention:

For specific descriptions of the recognizable text, the recognizable picture, and the recognizable scenario intention, refer to the descriptions in step S301. Details are not described herein again.

(1) If there is no invoking record of a voice skill that is based on the current display interface in the historical voice skill usage record, the voice assistant uses a voice skill corresponding to a clickable control (for example, an application icon) in the current display interface as a common voice skill in the current display interface. A voice skill command to invoke the common voice skill is a common voice skill command in the current display interface.

(2) If there is an invoking record of a voice skill that is based on the current display interface in the historical voice skill usage record, the voice assistant determines a voice skill that is invoked for more than a preset quantity of times and that corresponds to a clickable control (for example, an application icon) in the current display interface in the historical voice skill usage record as a common voice skill in the current display interface. A voice skill command to invoke the common voice skill is a common voice skill command in the current display interface.

2. A current display interface of the electronic device having recognizable text and/or a recognizable picture:

A common voice skill in the current display interface of the electronic device having the recognizable text and/or picture is a voice skill corresponding to the recognizable text and/or picture in the current display interface, and a voice skill command to invoke the common voice skill is a common voice skill command in the current display interface.

For example, "Fast & Furious" is recognized through an NLU entity recognition API or a HiTouch capability from the recognizable text and/or picture in the display interface, and a common voice skill command is a voice skill command related to "Fast & Furious", for example, "Search Fast & Furious".

3. A current display interface of the electronic device having a recognizable scenario intention:

A common voice skill in the current display interface of the electronic device having the recognizable scenario intention is a voice skill corresponding to the recognizable scenario intention in the current display interface, and a voice skill command to invoke the common voice skill is a common voice skill command in the current display interface.

For example, "Xiaolongkan Hot Pot on Huadong Road" is recognized from recognizable text and/or a recognizable picture in the display interface through the NLU entity recognition API or the HiTouch capability. An address "Xiaolongkan Hot Pot on Huadong Road" is recognized through an NLU intention recognition API. In this case, a common voice skill in the current display interface is a voice skill related to the address "Xiaolongkan Hot Pot on Huadong Road", and a common voice skill command may be "Navigate to Xiaolongkan Hot Pot on Huadong Road".

4. Current moment:

At the current moment, a common voice skill is a voice skill corresponding to regular behavior that is based on the current moment, a third-party application, or a native application, and a voice skill command to invoke the common voice skill is a common voice skill command in the current display interface. The regular behavior based on the current moment is behavior that is often made by the user at the current moment in the past. The third-party application is an application downloaded by the user from an application store, for example, "WeChat", and the native application is a system application provided by the electronic device, which is also referred to as an embedded application, for example, "Camera".

For example, the current moment is 10:28 a.m., and the user often uses "Voice Translation" and uses software "Youdao Dictionary" at the current moment in the historical voice skill usage record. Common voice skill commands may be "Open Voice Translation" and "Open Youdao Dictionary".

5. Current location of the electronic device:

At the current location of the electronic device, a common voice skill is a voice skill corresponding to regular behavior that is based on the current location of the electronic device, a third-party application, or a native application, and a voice skill command to invoke the common voice skill is a common voice skill command in the current display interface. The regular behavior based on the current location is behavior that is often made by the user in the current location of the electronic device in the past.

For example, the current location of the electronic device is the home. The user often uses "Tencent Video" in the current location of the electronic device in the historical voice skill usage record, and a common voice skill command may be "Open Tencent Video".

6. Current motion state of the electronic device:

In the current motion state of the electronic device, a common voice skill is a voice skill corresponding to regular behavior that is based on the current motion state of the electronic device, a third-party application, or a native application, and a voice skill command to invoke the common voice skill is a common voice skill command in the current display interface. The regular behavior based on the current motion state of the electronic device is behavior that is often made by the user in the current motion state of the electronic device in the past.

For example, the current motion state of the electronic device is a running state. The user often uses "Music" in the current motion state of the electronic device in the historical voice skill usage record, and a common voice skill command may be "Open Music".

7. Current Event:

In the current event, a common voice skill is a voice skill corresponding to a preset event (for example, a preset schedule or an alarm clock), or an operation (or referred to as an associated operation) related to a plurality of applications, and a voice skill command to invoke the common voice skill is a common voice skill command in the current display interface. The current event may be determined based on information items such as the current moment, the current location of the electronic device, and the current display interface of the electronic device. For example, if the current moment is 6:50 and the location of the electronic device is the home, it may be determined that the current event is getting up. The associated operation relates to a plurality of applications. For example, after music is played, "Financial News" is opened and "Alipay" is then opened.

For example, the current event is getting up. In the historical voice skill usage record, the user often uses a voice skill corresponding to an associated operation. For example, the associated operation is first playing weather, and then opening "Music" and playing music, and a voice skill command corresponding to the associated operation is "I get up". In addition, the user often presets a schedule after getting up to "learn English at 8:00 a.m.". Therefore, common voice skill commands may be "I get up" and "Open 'English Liulishuo'".

8. Application currently running on the electronic device:

In the application currently running on the electronic device, a common voice skill is a voice skill corresponding to an operation with a relatively long path (that is, a user needs to manually touch and tap for a plurality of times), a function in an application currently running on the electronic device, and/or a related cross-application service, and a voice skill command to invoke the common voice skill is a common voice skill command in the current display interface.

For example, the application currently running on the electronic device is "WeChat", and a current display interface is a "Discovery" interface of "WeChat". In this case, if the user needs to open a payment code, the user needs to perform a plurality of tap operations, for example, first taps "Me", then taps "Money", and finally taps "Receive Money" to open a WeChat payment code. The operation in this example requires the user to perform a plurality of operations. Therefore, when the application currently running on the electronic device is "WeChat" and the display interface is the "Discovery" interface of "WeChat", "Open the payment code" is the operation with a relatively long path. In this case, the cross-application related service may be "Open Music", and the function in the application currently running on the electronic device may be "View Moments" or the like. In conclusion, common voice skill commands may be an operation such as "Open a payment code", "View Moments", and/or "Open Music".

In addition, recommendation of voice skill commands by the voice assistant (a process in which the voice assistant displays voice skill commands in the display interface, namely, a process in which the voice assistant recommends voice skill commands) may be classified into system-level recommendation and module-level recommendation according to different information items included in the first application scenario. Recommendation of voice skill commands by the voice assistant to the user based on the first application scenario including at least one information item in the current moment, the current location of the electronic device, the current event, and the current display interface of the electronic device is the system-level recommendation. Recommendation of voice skill commands by the voice assistant to the user based on the first application scenario including the application currently running on the electronic device is the module-level recommendation, or may be referred to as application-level recommendation.

Optionally, in another possible implementation, the voice assistant may analyze the historical voice skill usage record and the first application scenario according to a voice skill command recommendation algorithm, to determine common voice skills in the first application scenario, and recommend voice skill commands corresponding to the common voice skills to the user. The voice skill command recommendation algorithm may be a machine learning algorithm or the like.

S303: The voice assistant displays the common voice skill commands in the first application scenario in a display interface.

According to step S302, the voice assistant may determine the common voice skill commands in the first application scenario, and then the voice assistant displays the common voice skill commands in the display interface, so that the user enters a voice skill command in a correct format based on the voice skill commands displayed in the display interface.

After step S302, there may be a large quantity of common voice skill commands determined by the voice assistant in the first application scenario, and the voice assistant cannot display all the common voice skill commands in the display interface. In this case, after step S302, the voice assistant further needs to determine display locations of the common voice skill commands and whether the common voice skill commands are displayed in the display interface.

Optionally, the voice assistant may determine, based on the historical voice skill usage record and the first application scenario, appearance frequency of voice skills invoked by the common voice skill commands in the first application scenario. Then, the voice assistant determines priorities of the common voice skills based on the appearance frequency of the common voice skills in the first application scenario. Higher appearance frequency indicates a higher priority. Finally, the voice assistant determines, based on the priorities of the common voice skills, display locations of the common voice skill commands in the display interface, and whether the common voice skill commands are displayed in the display interface. A common voice skill with a higher priority is preferentially displayed in the display interface, and a voice skill command corresponding to the common voice skill with a higher priority is displayed in upper or left of the display interface.

For example, common voice skills are a voice skill A, a voice skill B, and a voice skill C. In the historical voice skill usage record, the voice skill A appears for five times in the first application scenario, the voice skill B appears for three times in the first application scenario, and the voice skill C appears for four times in the first application scenario. The common voice skills A, B, and C are sorted in descending order of priorities: the voice skill A, the voice skill C, and the voice skill B. For example, voice skill commands corresponding to the voice skills A, B, and C are "Open Voice Translation", "What can you do", and "Special features of the phone" respectively. If two voice skill commands are displayed in the display interface, the voice skill command corresponding to the voice skill B with a lowest priority is not displayed.

Figure 4:
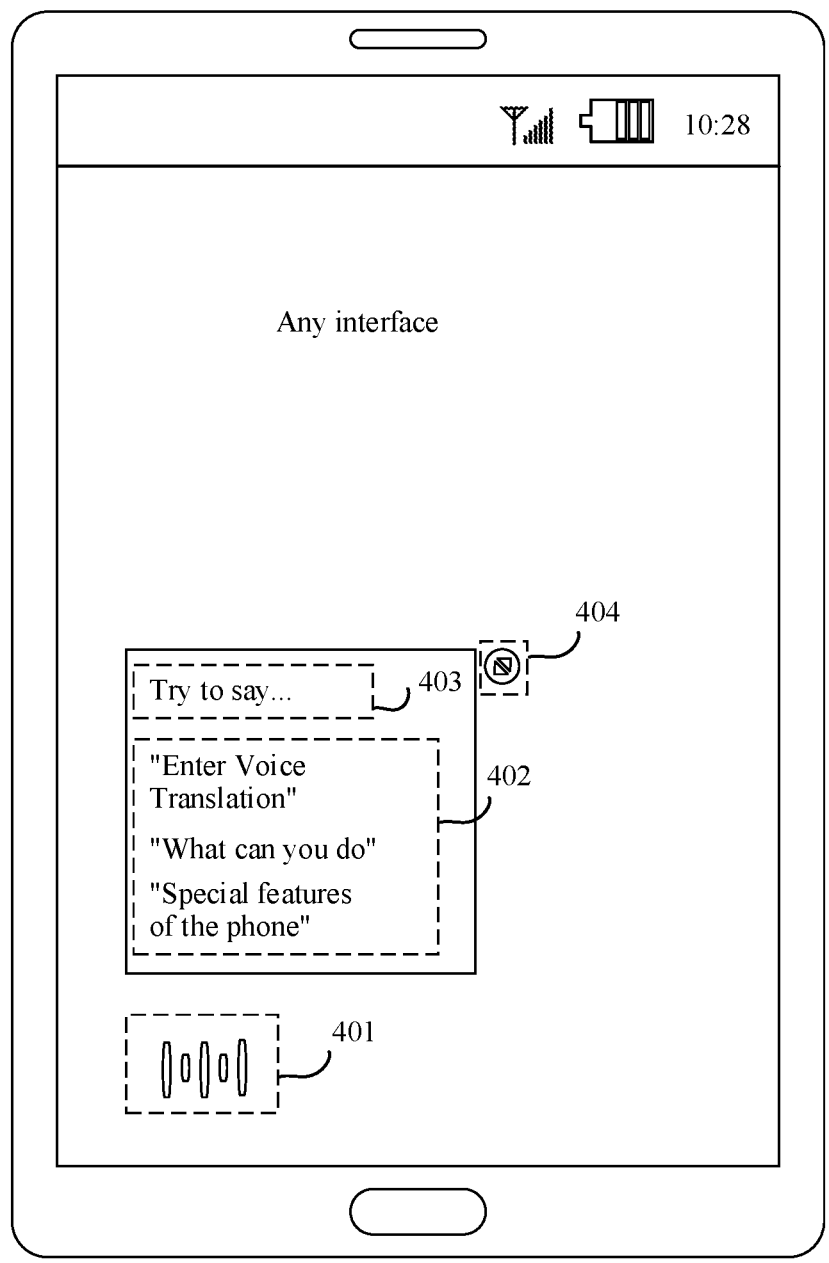
FIG. 4 is a schematic diagram 1 of displaying common voice skill commands according to an embodiment of this application.

In the foregoing example, the display interface of the electronic device may be shown in FIG. 4. In any interface of the electronic device, the voice assistant is displayed in floating mode. Refer to FIG. 4. Content shown in 401, 402, 403, and 404 are all displayed in floating mode. Optionally, the content shown in 402 and 403 may be displayed in a same card. A prompt picture shown in 401 is a sound wave, and indicates that the voice assistant is in a sound pickup state. Optionally, as shown in 402, the voice skill commands are displayed in (descending) order of the priorities of the common voice skills A, B, and C corresponding to the voice skill commands. For example, "Open Voice Translation", "Special features of the phone", and "What can you do" are displayed successively from top to bottom (certainly, the voice skill commands may alternatively be displayed in ascending order of the priorities of the common voice skills, and this is not shown in the figure). Optionally, prompt text shown in 403 is used to prompt the user to enter a voice skill command, for example, "Try to say . . . ". Optionally, a prompt picture shown in 404 is used to switch the voice assistant from the floating mode to a full-screen mode. When the voice assistant is displayed in full-screen mode, a ratio of an application interface of the voice assistant to the entire display interface of the electronic device is 1. If the user taps the prompt picture shown in 403, the voice assistant is displayed in full-screen mode, as shown in FIG. 5.

Figure 5:
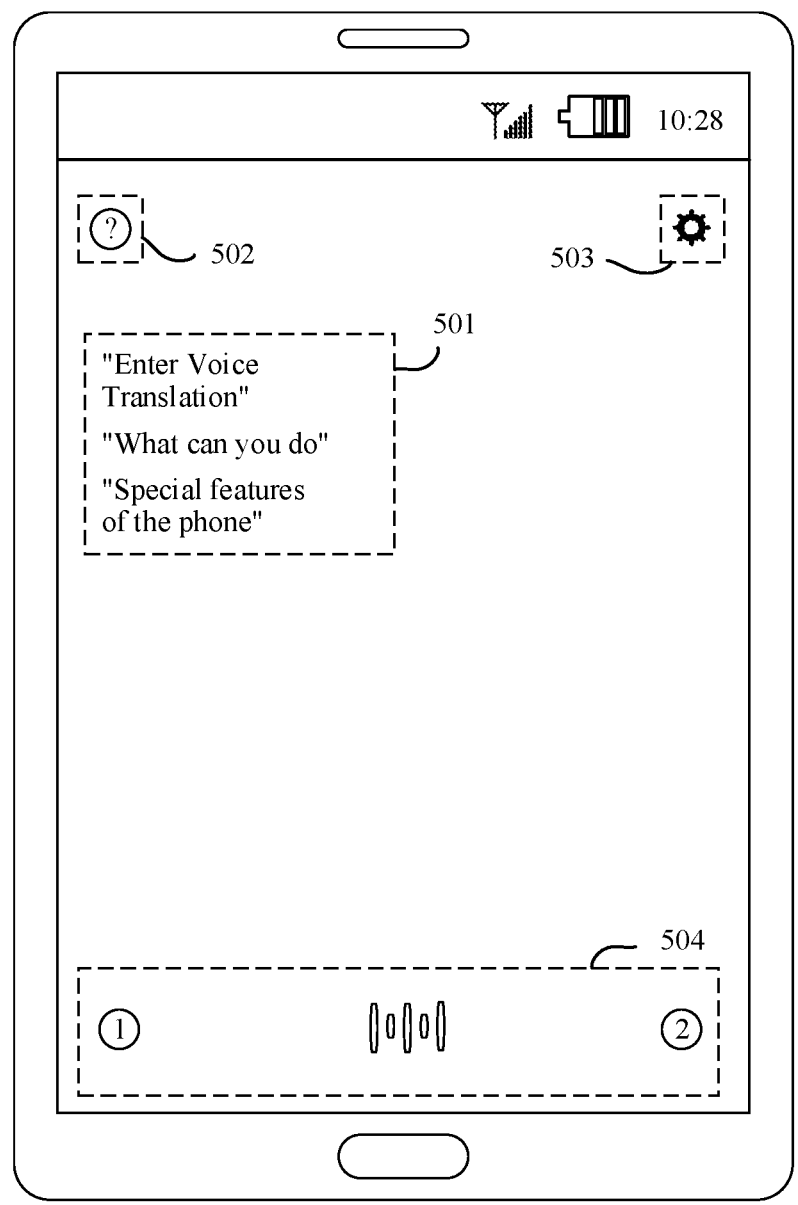
FIG. 5 is a schematic diagram 2 of displaying common voice skill commands according to an embodiment of this application.

Refer to FIG. 5. If the current display interface of the electronic device changes, common voice skill commands and priorities thereof may change, or may be the same as the common voice skill commands and the priorities thereof shown in 402 in FIG. 4. In this example, an example in which the common voice skill commands and the priorities thereof do not change is used for description. As shown in 501, the voice skill commands are displayed in (descending) order of the priorities of the common voice skills A, B, and C corresponding to the voice skill commands. For example, "Open Voice Translation", "Special features of the phone", and "What can you do" are displayed successively from top to bottom (certainly, priorities of the voice skill commands from bottom to top may alternatively be in ascending order, and this is not shown in the figure). Optionally, the user may enter a voice skill command by tapping a command shown in 501. Optionally, a "Help" button of the voice assistant is shown in 502, and the user may tap the "Help" button to be familiar with a usage method of the voice assistant. Optionally, a "Settings" button of the voice assistant is shown in 503, and the user may tap the "Settings" button to open a setting interface of the voice assistant, so as to modify a setting item of the voice assistant. The setting interface of the voice assistant includes an open method of the voice assistant, common voice skill commands set by the user, and the like. Optionally, a prompt picture shown in 504 is a sound wave, and indicates that the voice assistant is in a sound pickup state. Optionally, a button "1" and a button "2" are provided on both sides of the sound wave shown in 504, where "1" and "2" are used to switch a voice skill command input mode. For example, the button "1" is tapped, to switch the voice skill command input mode to a keyboard input mode. The button "2" is tapped, to switch the voice skill command input mode to a video input mode.

Figure 6:
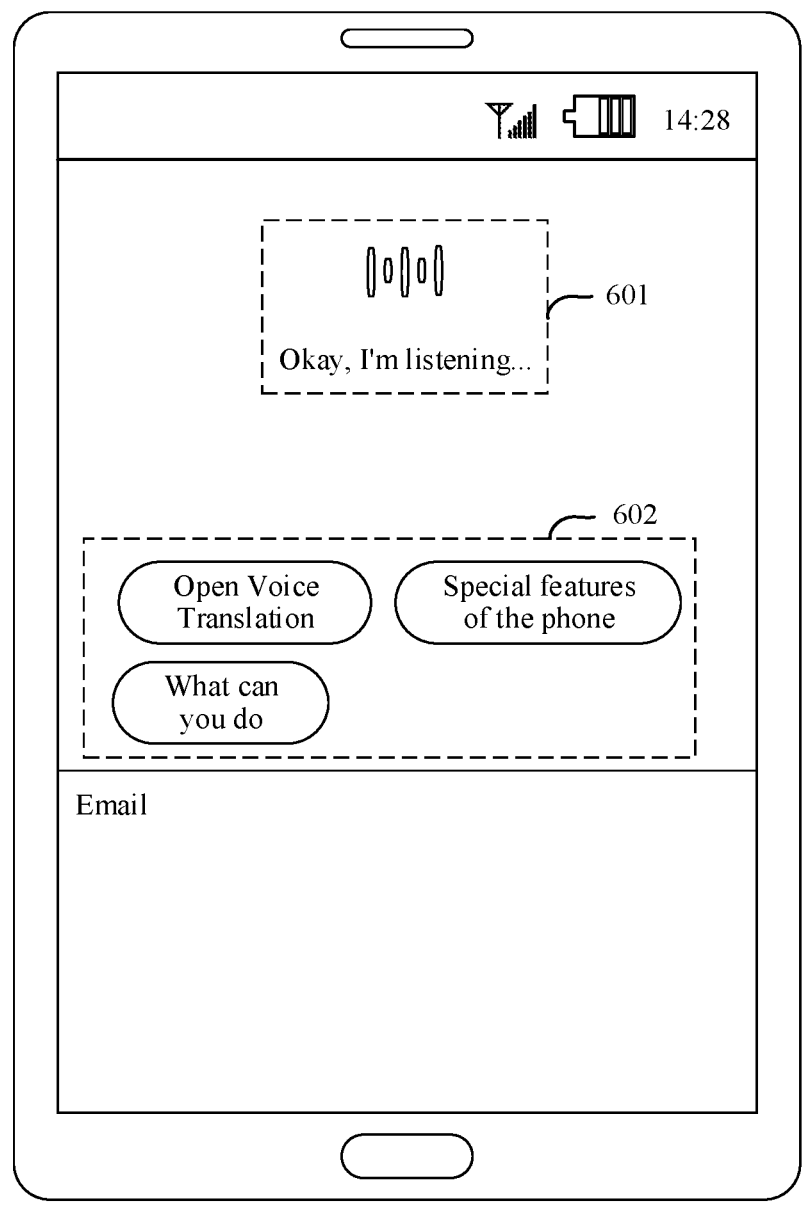
FIG. 6 is a schematic diagram 3 of displaying common voice skill commands according to an embodiment of this application.

In the foregoing example, the voice assistant may alternatively be displayed in half-screen mode. In this case, a ratio of the application interface of the voice assistant to the entire display interface of the electronic device is greater than 0 and less than 1. The application interface of the voice assistant and an application interface of another application may be displayed in split-screen mode, or the application interface of the voice assistant and a part of a home screen may be displayed in split-screen mode, for example, some application icons on the home screen. In this example, an example in which the application interface of the voice assistant and an application interface of "Email" are displayed in split screen mode is used for description, as shown in FIG. 6. Refer to FIG. 6. A prompt picture and prompt text shown in 601 indicate that the voice assistant is in a sound pickup state, where the prompt picture may be a sound wave, and the prompt text may be "Okay, I'm listening . . . ". Optionally, as shown in 602, the voice skill commands are displayed in descending order of the priorities of the common voice skills A, C, and B corresponding to the voice skill commands. For example, "Open Voice Translation", "Special features of the phone", and "What can you do" are displayed successively from left to right (certainly, priorities of the voice skill commands from right to left may alternatively be in ascending order, and this is not shown in the figure).

It can be learned from the specific description of step S302 that there may be two implementations in which the voice assistant determines the common voice skill commands in the first application scenario: the implementation 1 and the implementation 2. For the implementation 2 in step S302, this application may further provide another specific implementation of step S303. The following describes the another specific implementation of step S303 by using a specific example.

A larger quantity of information items in the first application scenario indicates higher practicability of the common voice skill commands displayed by the voice assistant in the display interface. Therefore, for a common voice skill, a larger quantity of information items in an application scenario for invoking the voice skill the same as the information items in the first application scenario indicates a higher priority of the voice skill. When quantities of information items in application scenarios for invoking voice skills the same as the information items in the first application scenario are the same, a voice skill that is invoked more frequently has a higher priority.

For example, the first application scenario includes two information items: an information item 1 and an information item 2. For example, the information item 1 indicates that the current moment is 10:00 a.m., and the information item 2 indicates that the current location of the electronic device is the company. For common voice skills A, B, C, and D, the historical voice skill usage record includes six voice skill usage records. Among the six voice skill usage records, there are two usage records of the voice skill A, two usage records of the voice skill B, one usage record of the voice skill C, and one usage record of the voice skill D. The six usage records are represented by a1, a2, b1, b2, c, and d. In a1, an application scenario for invoking the voice skill A includes the information item 1. In a2, an application scenario for invoking the voice skill A includes the information item 2. In b1 and b2, application scenarios for invoking the voice skill B include the information item 1 and the information item 2. In c, an application scenario for invoking the voice skill C includes the information item 1 and the information item 2. In d, an application scenario for invoking the voice skill D includes the information item 1. The application scenarios for invoking the voice skill B include the information item 1 and the information item 2 twice, and the application scenario for invoking the voice skill C includes the information item 1 and the information item 2 once. The application scenarios for invoking the voice skill A and the application scenario for invoking the voice skill D each include only one of the information item 1 and the information item 2. Therefore, priorities of the voice skills B and C are higher than those of the voice skills A and D, and the priority of the voice skill B is higher than that of the voice skill C. When the application scenarios for invoking the voice skills A and D each include only one of the information item 1 and the information item 2, the voice skill A is invoked twice and the voice skill D is invoked once. In this case, the priority of the voice skill A is higher than that of the voice skill D. The voice assistant displays voice skill commands corresponding to the voice skills B, C, A, and D in a priority order of the voice skills A, B, C, and D. For a manner in which the voice assistant determines display locations of the voice skill commands in the display interface in the priority order of the common voice skills, refer to the foregoing example. Details are not described herein again.

It should be noted that if the voice assistant is woken up for the first time on the current electronic device, the voice assistant does not determine the first application scenario, but determines a user type of a current user, a network connection status, and/or whether the voice assistant can normally obtain high-frequency voice skill commands in a current network, and obtains a determining result. Subsequently, the voice assistant displays corresponding voice skill commands in the display interface based on the determining result. The user type of the current user includes a new user and an old user, and the network connection status includes a normal network connection and an abnormal network connection.

For example, if account registration duration of the current user does not exceed preset registration duration (for example, six months), the user type of the current user is a new user. If the account registration duration of the current user exceeds the preset registration duration, or if the account registration duration of the current user does not exceed the preset registration duration, but the current user performs a cloud backup restoration operation on the electronic device, the user type of the current user is an old user. In addition, a case of the abnormal network connection may include a slow network connection, a poor network signal, a network disconnection, a network fault, or the like.

For example, on the current electronic device, after the voice assistant is woken up for the first time, if (the user type of) the current user is a new user, the network connection is normal, and the voice assistant can normally obtain the high-frequency voice skill commands in the current network, the voice assistant displays the high-frequency voice skill commands in the current network in the display interface. The high-frequency voice skill commands may be voice skill commands that appear for more than a preset quantity threshold in the current network. If (the user type of) the current user is an old user, the voice assistant first determines, as common voice skill commands of the current user based on a quantity of times of using each voice skill command in the historical voice skill usage record, voice skill commands whose quantities of using times exceed the preset quantity threshold, or the first n (n>1) voice skill commands that are used for a large quantity of times. Then the voice assistant displays the common voice skill commands of the current user in the display interface. For a detailed description of the historical voice skill usage record, refer to the description in the step S302. Details are not described herein again. If the network connection is abnormal, the voice assistant notifies the user that a network is abnormal via text or voice, and displays, in the display interface, voice skill commands to open network system settings, where the network system settings include setting items such as enabling a data connection and enabling a Wi-Fi connection. If the voice assistant cannot normally obtain the high-frequency voice skill commands in the current network, the voice assistant displays preset voice skill commands in the display interface. The preset voice skill commands are voice skill commands manually configured by a developer in a dialog development platform.

For example, in another possible implementation, on the current electronic device, after the voice assistant is woken up for the first time, if the current user is a new user, the network connection is normal, and the voice assistant can normally obtain the high-frequency voice skills in the current network, the voice assistant displays voice skill commands corresponding to the high-frequency voice skills in the current network in the display interface. The high-frequency voice skills may be voice skills that appear for more than a preset quantity threshold in the current network. If the current user is an old user, the voice assistant first determines, as common voice skills of the current user based on a quantity of times of invoking each voice skill in the historical voice skill usage record, voice skills whose quantities of using times exceed the preset quantity threshold, or the first n (n>1) voice skills that are used for a large quantity of times. Then the voice assistant displays voice skill commands corresponding to the common voice skills of the current user in the display interface. For a detailed description of the historical voice skill usage record, refer to the description in the following step S302. Details are not described herein again. If the network connection is abnormal, the voice assistant notifies the user that a network is abnormal via text or voice, and displays, in the display interface, voice skill commands corresponding to voice skills to open network system settings. If the voice assistant cannot normally obtain the high-frequency voice skills in the current network, the voice assistant displays voice skill commands corresponding to preset voice skills in the display interface. The preset voice skills are voice skills manually configured by a developer in a dialog development platform.

Similarly, if the current network connection is abnormal, and the voice assistant on the current electronic device is not woken up for the first time, the voice assistant displays text information in the display interface, for example, "The current network is abnormal", to notify the user that the network connection is abnormal. Optionally, when the voice assistant displays the text information "The current network is abnormal" in the display interface, the voice assistant may also play the text information via voice. Optionally, the voice assistant may alternatively display, in the display interface, voice skill commands to open network system settings, and the network system settings include setting items such as enabling a data connection or enabling a Wi-Fi connection.

This application provides the voice interaction method. After being woken up, the voice assistant may determine the first application scenario based on the one or more information items, and then determine the common voice skill commands in the first application scenario based on the first application scenario and the historical voice skill usage record. That is, the voice assistant determines, based on a usage habit of the user and a current application scenario, a voice skill command that may be entered by the user in the current application scenario. Finally, the voice assistant displays the common voice skill commands in the first application scenario in the display interface. Through these steps, the voice assistant may recommend the common voice skill commands in the current application scenario to the user, to implement scenario-based recommendation of voice skill commands. According to the foregoing process, the voice assistant can recommend the common voice skill commands in the first application scenario to the user, to implement scenario-based recommendation of voice skill commands, so that the user can invoke, based on the voice skill commands recommended by the voice assistant, a voice skill that the user wants to use. This reduces cases in which the voice assistant fails to recognize a voice skill command entered by the user, or the voice assistant fails to invoke a voice skill command based on a voice skill command entered by the user, and improves interaction experience between the user and the voice assistant.

To further implement scenario-based recommendation of voice skill commands and enable the user to enter a correct voice skill command, this application further provides a voice interaction method. As shown in FIG. 3(b), after step S303, step S304 is further included.

S304: In response to a voice skill command entered by the user, the voice assistant invokes a voice skill corresponding to the voice skill command entered by the user.

Optionally, the voice assistant receives, through voice interaction, keyboard interaction, video interaction, or the like, the voice skill command entered by the user. The voice skill command is entered by the user based on the voice skill commands displayed in the display interface (that is, the voice skill commands recommended by the voice assistant to the user), or may be entered by the user voluntarily. Then, in response to the voice skill command entered by the user, the voice assistant invokes the voice skill corresponding to the voice skill command. If the voice assistant fails to invoke the voice skill, the voice assistant performs rounds of dialogs with the user, to prompt the user to enter another voice skill command related to completing invoking the voice skill. Optionally, after receiving the voice skill command entered by the user, the voice assistant determines, based on time for invoking the voice skill in the historical voice skill usage record, another voice skill command that is entered by the user after the user enters the voice skill command. Subsequently, the voice assistant re-determines that the another voice skill command is a common voice skill command in the first application scenario, and displays the another voice skill command in the display interface.

Figure 7:
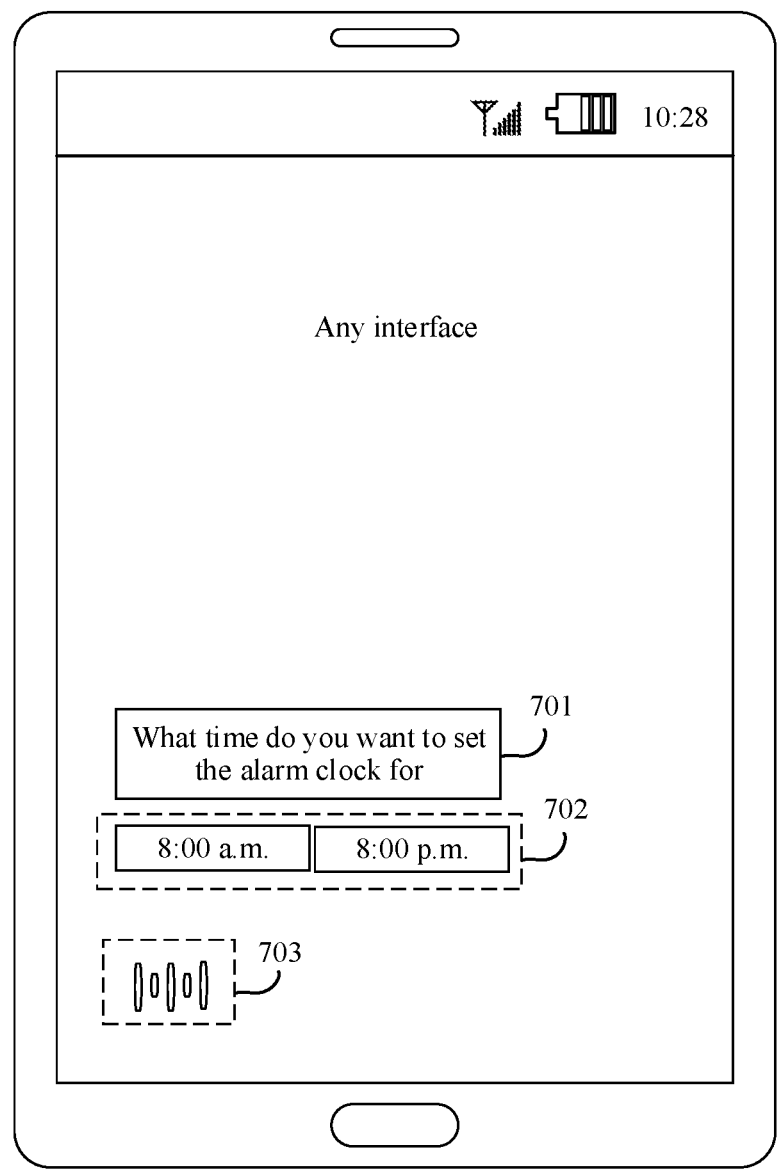
FIG. 7 is a schematic diagram 4 of displaying common voice skill commands according to an embodiment of this application.

For example, after receiving the voice skill command entered by the user, for example, "Set an alarm clock", the voice assistant cannot determine alarm time of the alarm clock. Therefore, the voice assistant cannot successfully invoke a corresponding voice skill based on the voice skill command and cannot implement a service invoked by the voice skill. In this case, the voice assistant needs to perform rounds of voice interaction with the user, that is, rounds of dialogs, to determine the alarm time, as shown in FIG. 7. Refer to FIG. 7. The voice assistant may prompt, via prompt text shown in 701, for example, "What time do you want to set the alarm clock for", the user to enter the alarm time of the alarm clock. In addition, the voice assistant may determine, based on the time for invoking the voice skill in the historical voice skill usage record, that after the user enters the voice skill command "Set an alarm clock", the user further often enters two voice skill commands: "8:00 a.m." or "8:00 p.m.". Therefore, other voice skill commands related to "Set an alarm clock" shown in 702 are "8:00 a.m.", "8:00 p.m.", and the like. A sound wave shown in 703 indicates that the voice assistant is in a sound pickup state. In this case, the voice assistant may enter anew voice skill command, for example, "8:00 a.m." based on the voice skill commands shown in 702. Then, the voice assistant may successfully invoke the voice skill based on two voice skill commands: "Set an alarm clock" and "8:00 a.m.", and complete an operation of "setting an alarm clock for 8:00 a.m.". The voice assistant may then stop sound pickup and enter a sleep state. It should be noted that the user may alternatively enter another related voice skill command based on a requirement of the user, for example, "7:00 a.m.". In this case, the voice assistant may successfully invoke the voice skill based on two voice skill commands: "Set an alarm clock" and "7:00 a.m.", and complete an operation of "setting an alarm clock for 7:00 a.m.".

In another possible implementation, if the voice assistant fails to invoke the voice skill, the voice assistant performs rounds of dialogs with the user, to prompt the user to enter another voice skill command related to completing invoking the voice skill. Optionally, the voice assistant re-determines, based on other voice skill commands manually set by the developer on a corresponding dialog node, that the other voice skill commands are common voice skill commands in the first application scenario, and displays the other voice skill commands in the display interface.

Figure 8:
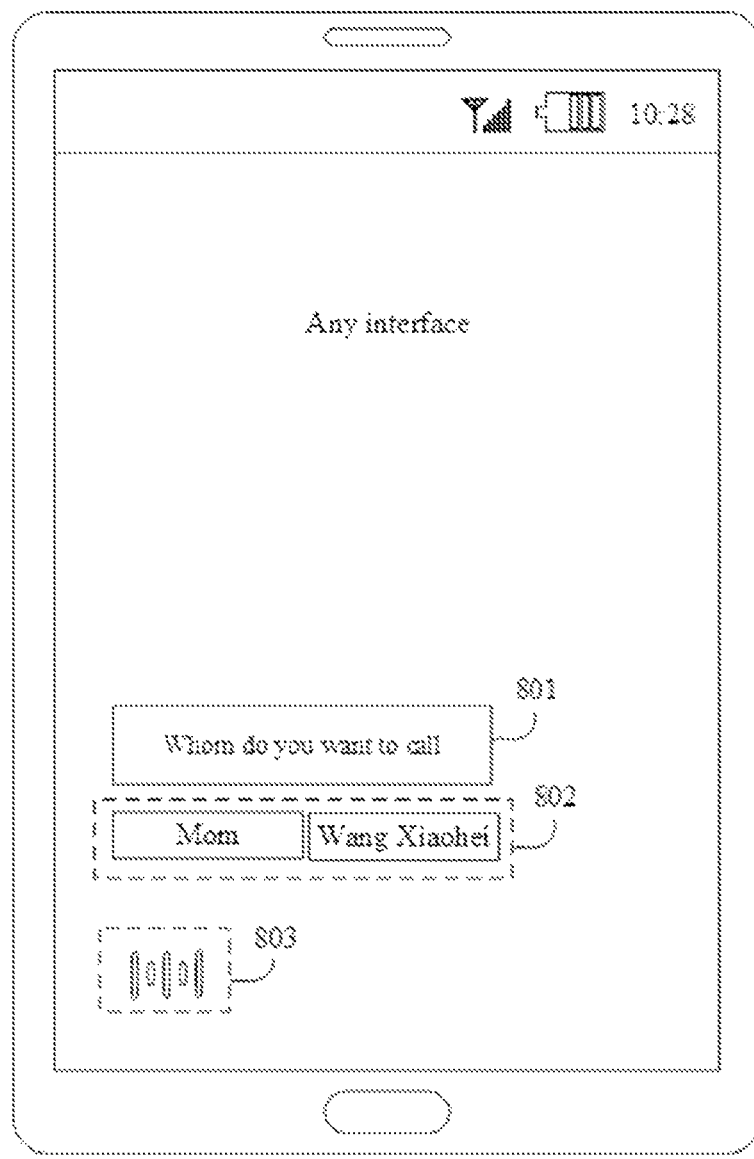
FIG. 8 is a schematic diagram 5 of displaying common voice skill commands according to an embodiment of this application.

For example, after receiving the voice skill command entered by the user, for example, "Make a call", the voice assistant cannot determine a call object. Therefore, the voice assistant cannot successfully invoke a corresponding voice skill based on the voice skill command and cannot implement a service invoked by the voice skill. In this case, the voice assistant needs to perform rounds of voice interaction with the user, to determine the call object, as shown in FIG. 8. Refer FIG. 8. The voice assistant may prompt, via prompt text shown in 801, for example, "Whom do you want to call", the user to enter the call object. In addition, the voice assistant may determine, based on the voice skill command "Make a call" entered by the user, a corresponding dialog node and another voice skill command related to "Make a call" that is manually set by the developer on the dialog node, for example, "Mom" or "Wang Xiaohei". Therefore, other voice skill commands shown in 802 are "Mom", "Wang Xiaohei", and the like. Sound wave shown in 803 indicates that the voice assistant is in a sound pickup state. In this case, the voice assistant may enter anew voice skill command, for example, "Wang Xiaohei" based on the voice skill commands shown in 802. Then, the voice assistant may successfully invoke the voice skill based on the two voice skill commands: "Make a call" and "Wang Xiaohei", to complete an operation of "calling Wang Xiaohei". The voice assistant may then stop sound pickup and enter a sleep state. It should be noted that the user may alternatively enter another related voice skill command based on a requirement of the user, for example, "Zhang Xiaobai". In this case, the voice assistant may successfully invoke the voice skill based on two voice skill commands: "Make a call" and "Zhang Xiaobai", to complete an operation of "calling Zhang Xiaobai".

Optionally, if the voice assistant successfully invokes the corresponding voice skill in response to the voice skill command entered by the user, after completing an operation corresponding to the voice skill, the voice assistant stops sound pickup and enters a sleep state. Alternatively, after successfully invoking the voice skill based on information determined through rounds of voice interaction of the voice assistant, and completing an operation corresponding to the voice skill, the voice assistant stops sound pickup and enters a sleep state.

Optionally, after entering the sleep state, the voice assistant may further re-determine the first application scenario, and display the voice skill commands recommended to the user in the display interface according to the technical solution in step S302 to step S304. Optionally, after entering the sleep state, the voice assistant may also receive a specific voice skill command entered by the user.

Figure 9A:
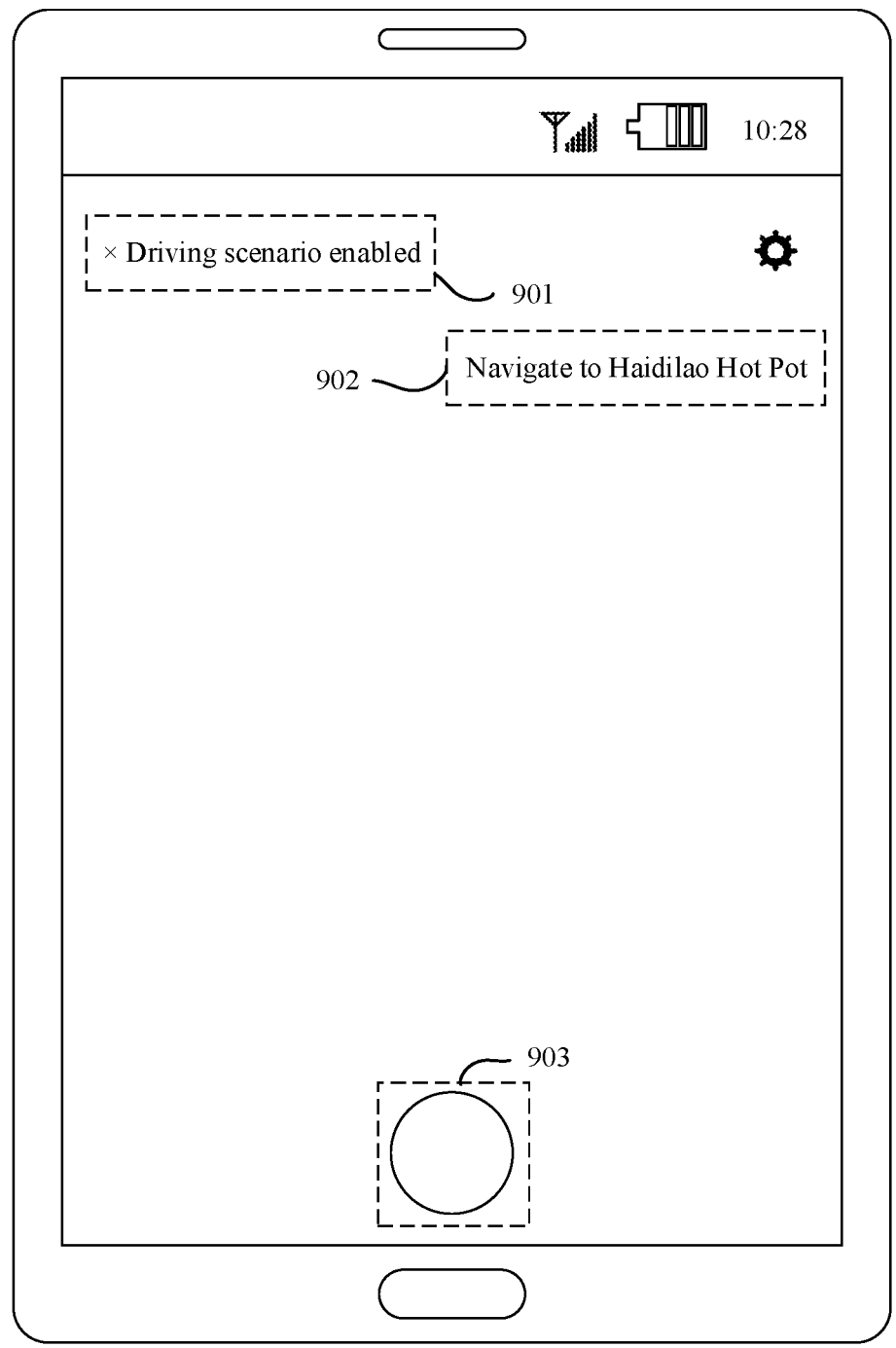
FIG. 9(a) to FIG. 9(c) are a schematic diagram 6 of displaying common voice skill commands according to an embodiment of this application.
Figure 9B:
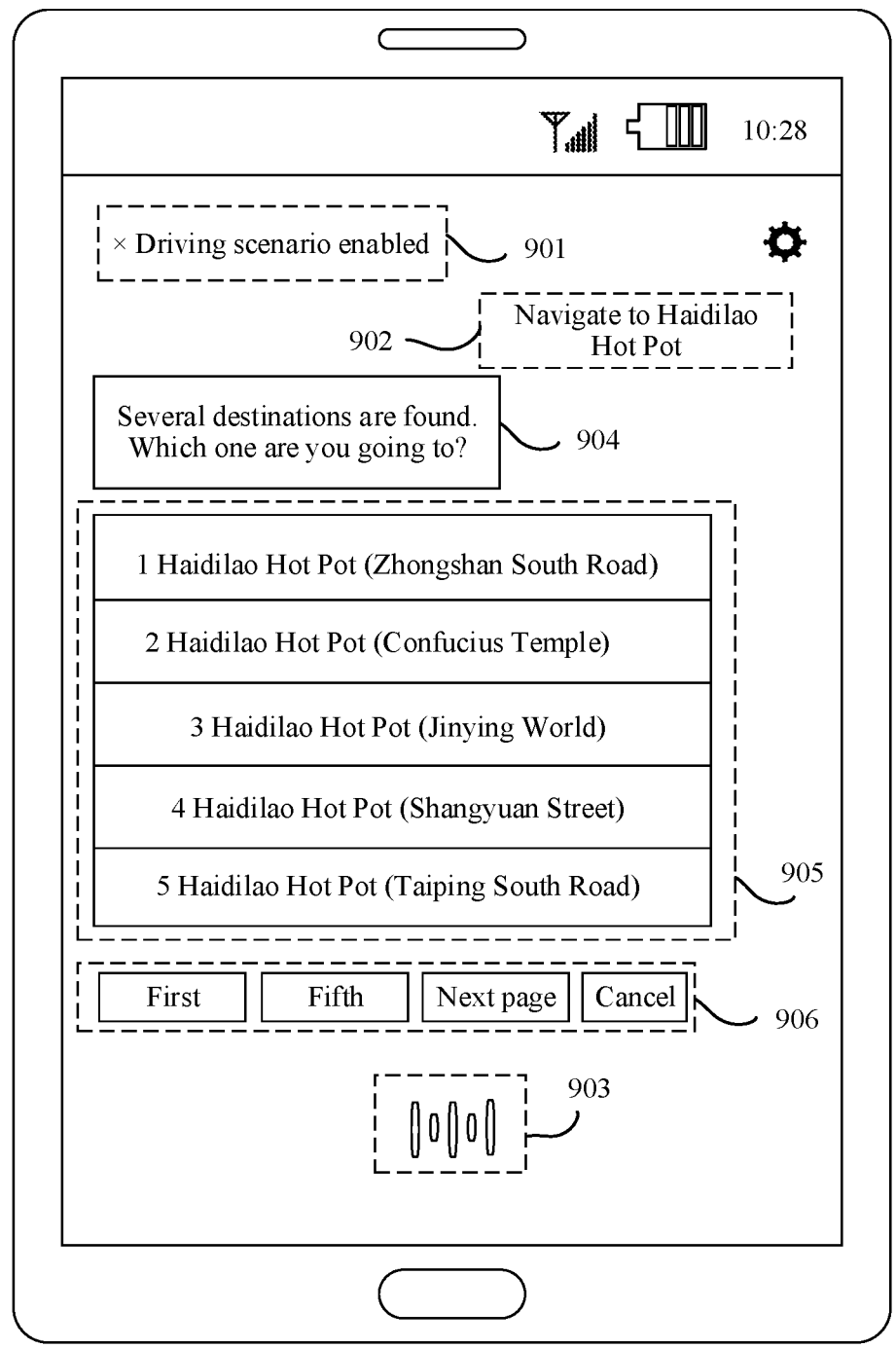
Figure 9C:
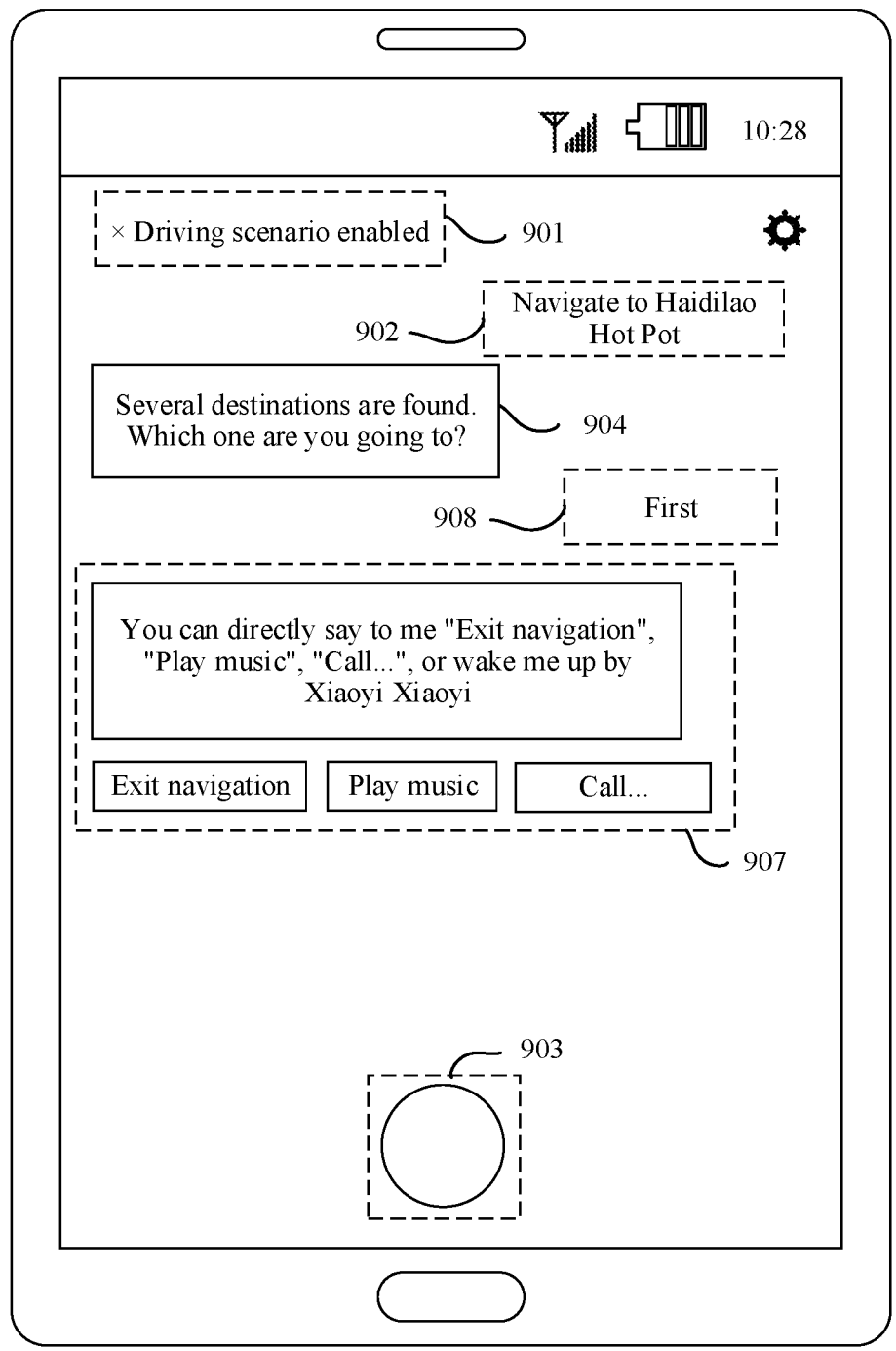
Figure 10A:
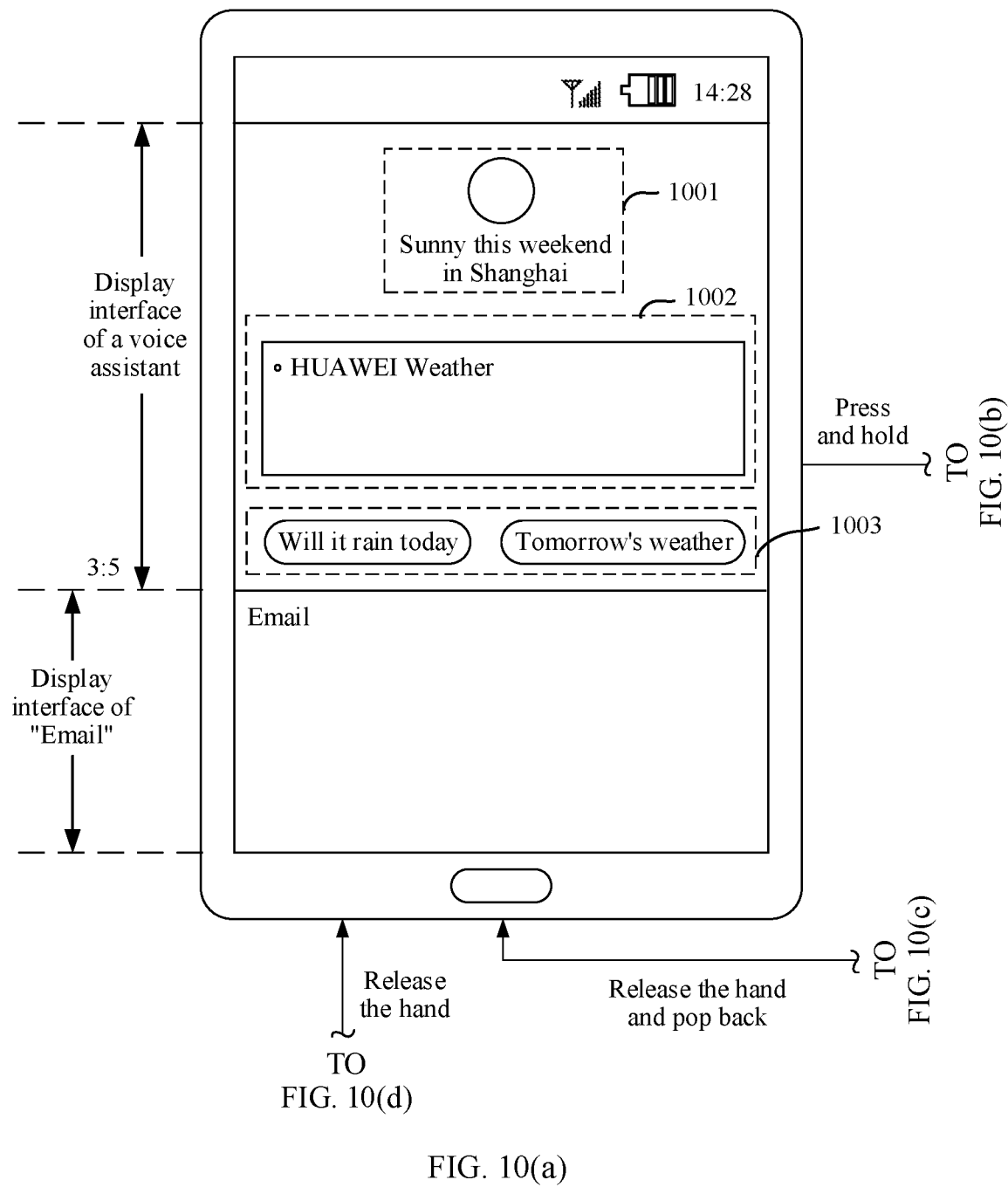
FIG. 10(a) to FIG. 10(d) are a schematic diagram 7 of displaying common voice skill commands according to an embodiment of this application.
Figure 10B:
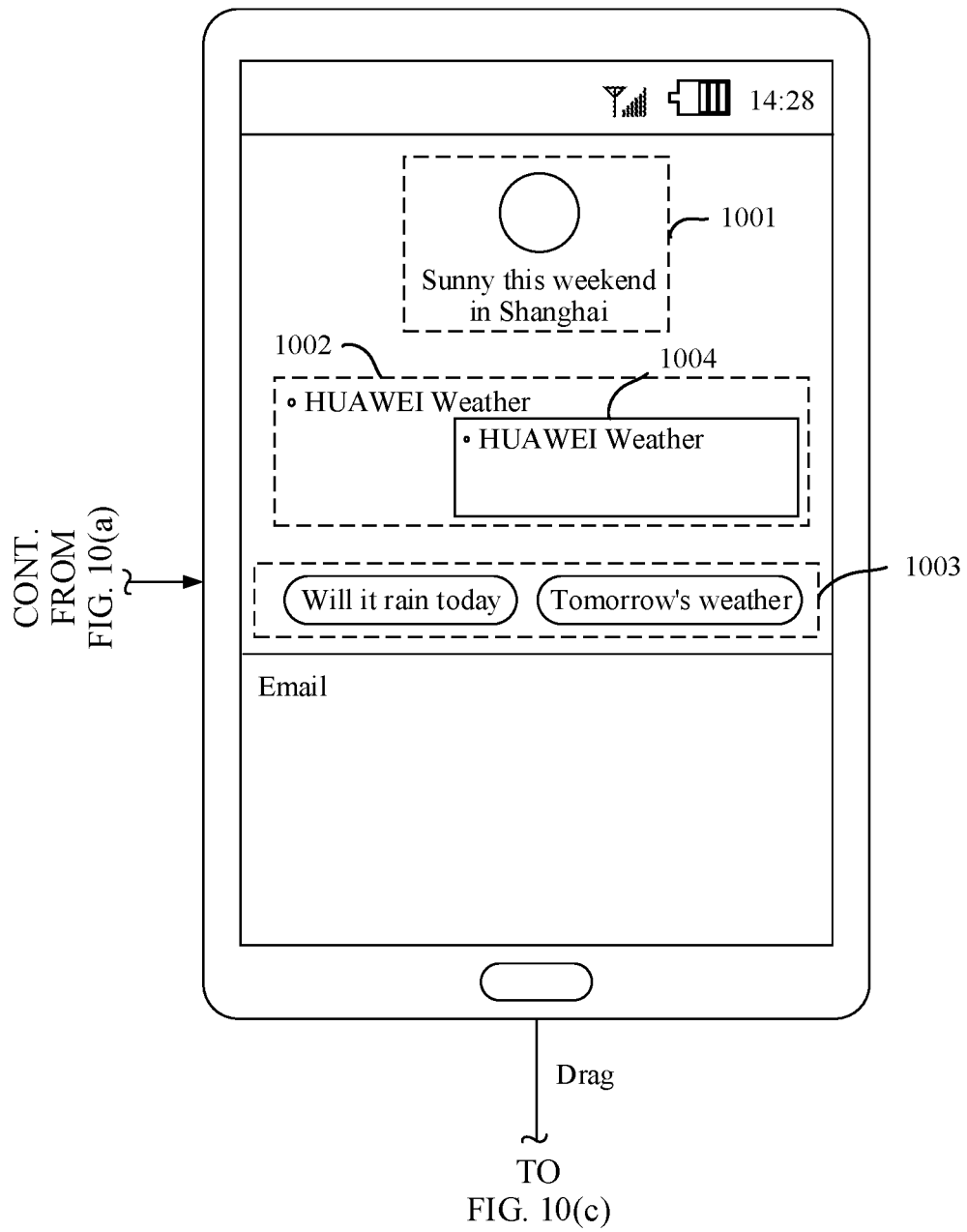
Figure 10C:
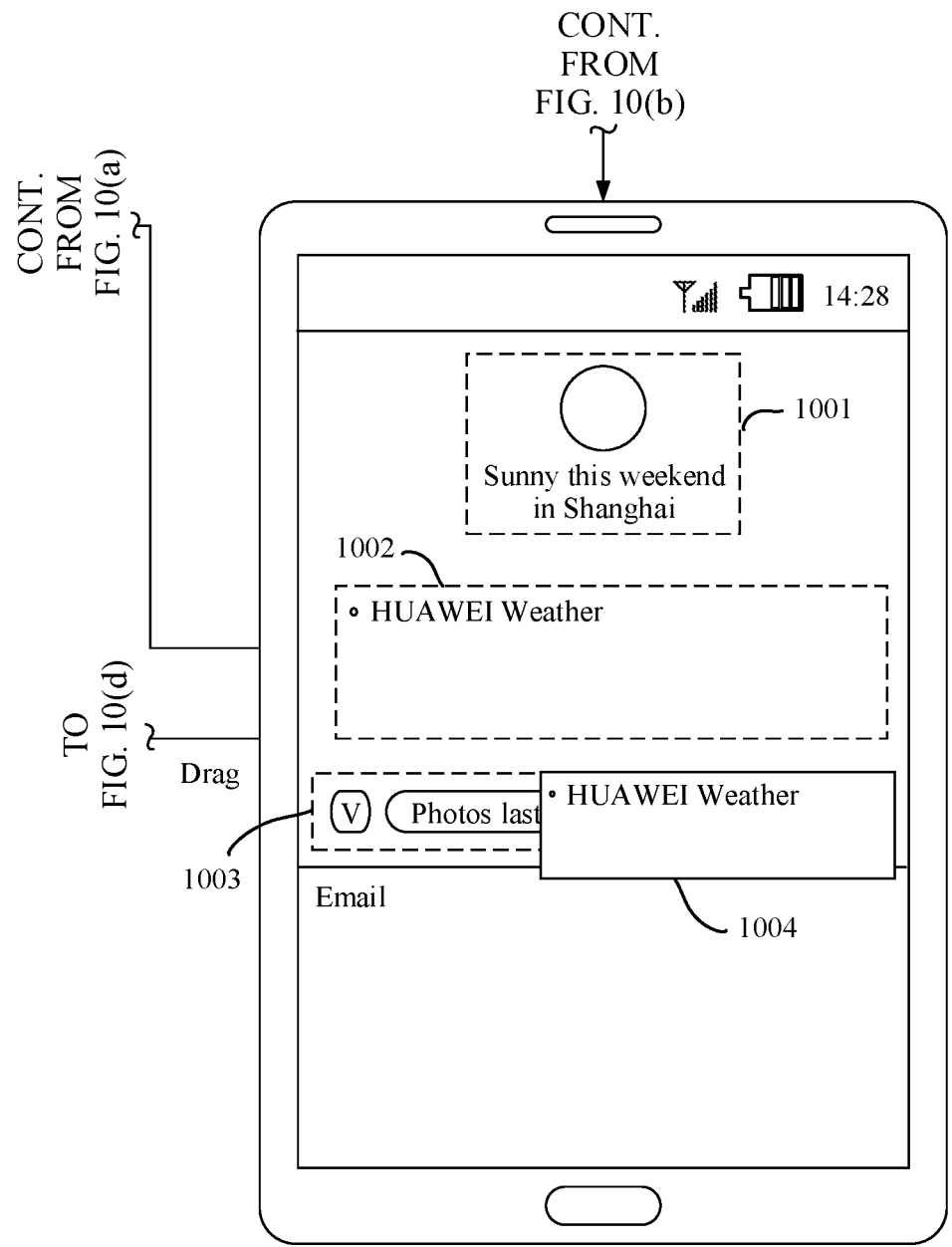
Figure 10D:
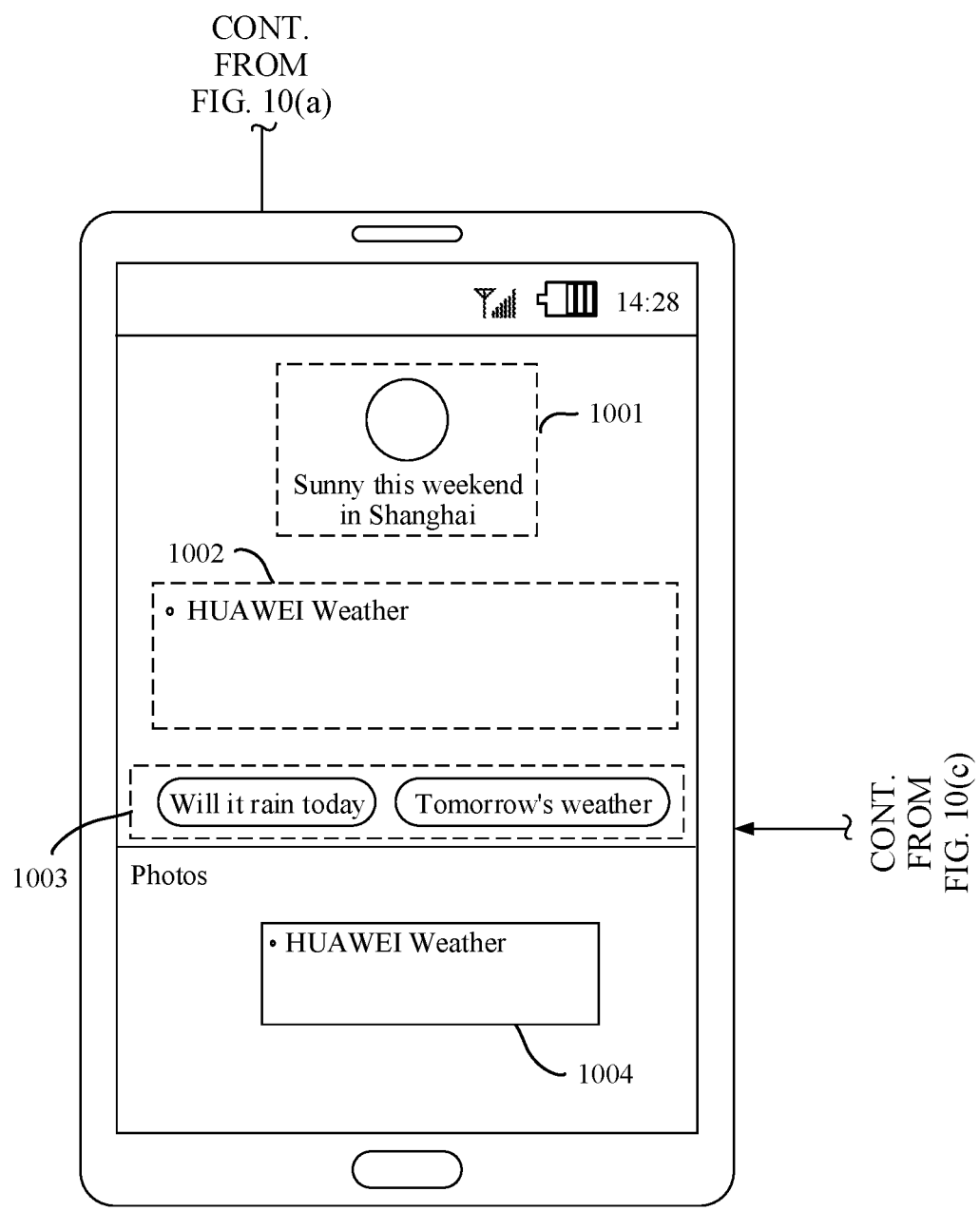

For example, in a driving scenario, after the voice assistant receives a voice skill command "Navigate to Haidilao Hot Pot" entered by the user, the display interface of the electronic device is shown in FIG. 9(*a*). Refer to FIG. 9(*a*). Prompt text shown in 901 indicates that a current scenario is a driving scenario, for example, "Driving scenario enabled". If the user taps a prompt picture shown in 901, for example, "x", the driving scenario is disabled. Prompt text shown in 902 is the voice skill command entered by the user, for example, "Navigate to Haidilao Hot Pot". A prompt picture shown in 903 is a floating ball, and indicates that the voice assistant stops sound pickup and is in the sleep state. The voice assistant performs search based on the voice skill command "Navigate to Haidilao Hot Pot" entered by the user, to obtain a plurality of destinations. Therefore, the voice assistant neither can determine a destination, nor can successfully invoke a corresponding voice skill based on the voice skill command and implement a service corresponding to the voice skill. In this case, the voice assistant needs to perform rounds of voice interaction with the user, to determine a destination and implement an operation of navigating to a place. The display interface of the electronic device is shown in FIG. 9(*b*). Content shown in 901 and 902 in FIG. 9(*b*) is the same as content shown in 901 and 902 in FIG. 9(*a*), and details are not described herein again. A prompt picture shown in 903 is changed to a sound wave, and indicates that the voice assistant is in the sound pickup state, and the user may enter a voice skill command. Prompt information shown in 904, for example, "Several destinations are found. Which one are you going to?" may inform the user that there are a plurality of destinations nearby and prompt the user to make a selection. Optionally, when the prompt information shown in 904 is displayed in the display interface, the voice assistant may play the prompt information "Several destinations are found. Which one are you going to?". Content shown in 905 is the nearby destinations found by the voice assistant based on the voice skill command entered by the user. Actually, a quantity of possible destinations found by the voice assistant may not be five shown in the figure. The user may tap any column in a destination search result shown in 905, for example, tap a column in which "Haidilao Hot Pot (Zhongshan South Road)" is located, to determine that the destination is "Haidilao Hot Pot (Zhongshan South Road)". 906 shows voice skill commands recommended by the voice assistant to the user, for example, "First", "Fifth", "Next page", and "Cancel". The user may further directly tap or enter "First" shown in 906 into the voice assistant to determine that the destination is "Haidilao Hot Pot (Zhongshan South Road)". If "Haidilao Hot Pot (Shangyuan Street)" is the destination of the user, the user may also directly enter a voice skill command "Fourth", "Navigate to Haidilao Hot Pot (Shangyuan Street)", or "Navigate to the fourth destination" into the voice assistant. If the user does not find a correct destination in the address shown in 906, the user may tap or enter "Next page" in the voice skill commands shown in 906 into the voice assistant to view other destination search results, or the user may directly tap or enter "Cancel" into the voice assistant, and then re-enter a voice skill command to navigate to a place. After the user enters "First" based on the voice skill commands shown in 906, the voice assistant determines that the destination is "Haidilao Hot Pot (Zhongshan South Road)", and starts navigation. In this case, the voice assistant enters a sleep state. The display interface of the electronic device is shown in FIG. 9(*c*). Content shown in 901, 902, and 904 in FIG. 9(*c*) is the same as content shown in 901, 902, and 904 in FIG. 9(*b*). A prompt picture shown in 903 is changed to a floating ball, and indicates that the voice assistant enters the sleep state. In addition, 907 shows prompt information, for example, "You can directly say to me", "Exit navigation", "Play music", "Call . . . ", or wake me up by "Xiaoyi Xiaoyi", and voice skill commands recommended by the voice assistant to the user based on the re-determined first application scenario and historical voice skill commands, such as "Exit navigation", "Play music", or "Call . . . " that are used to notify the user of voice skill commands that can be entered in the current scenario. Refer to the prompt information and the voice skill commands shown in 907. The electronic device may exit the driving scenario, perform another operation, or the like through voice interaction between the user and the voice assistant. Text information shown in 908 is a voice skill command "First" entered by the user based on the voice skills shown in 906.

Optionally, after the voice assistant is woken up, because a microphone is faulty or the user does not enter the voice skill command, the voice assistant does not receive, within a first preset time period, the voice skill command entered by the user. In this case, the voice assistant determines a second application scenario. Subsequently, the voice assistant determines common voice skill commands in the second application scenario based on the second application scenario and the historical voice skill usage record, and the voice assistant displays the common voice skill commands in the second application scenario in the display interface. The first preset time period may be determined by the user based on an actual application requirement, or may be preset by the voice assistant. In addition, for descriptions of the second application scenario and a specific implementation process of determining and displaying the common voice skill commands in the second application scenario, refer to the description of the first application scenario and the description of a specific implementation process of determining and displaying the common voice skill commands in the first application scenario in the foregoing content. Details are not described herein again.

Optionally, the voice assistant is closed if the voice assistant does not receive, within a second preset time period, the voice skill command entered by the user after being woken up.

The second preset time period is longer than the first preset time period, and the second preset time period and the first preset time period starts timing from a same time point. The second preset time period may be determined by the user based on an actual application requirement, or may be preset by the voice assistant. According to this process, a resource waste caused by waking up the voice assistant through an accidental touch by the user can be reduced.

Optionally, in another possible implementation, after the voice assistant determines the second application scenario after the first preset time period, and displays the common voice skill commands in the second application scenario in the display interface, the voice assistant is closed if the voice assistant does not receive, within a second preset time period, a voice skill command entered by the user. In this case, the second preset time period is after the first preset time period, and the second preset time period may be longer than the first preset time period, or may be shorter than the first preset time period. The first preset time period and the second preset time period may be determined by the user based on an actual application requirement, or may be preset by the voice assistant.

Optionally, after the voice assistant is woken up, because a voice skill to be invoked by the voice skill command that is entered by the user and received by the voice assistant exceeds a range of voice skills that can be invoked by the voice assistant, or the voice assistant fails to correctly recognize the voice skill command entered by the user, the voice assistant cannot invoke the voice skill corresponding to the voice skill command. In this case, the voice assistant determines a second application scenario, then determines common voice skill commands in the second application scenario based on the second application scenario and the historical voice skill usage record, and the voice assistant displays the common voice skill commands in the second application scenario in the display interface, to re-recommend voice skill commands that may be used by the user. The first preset time period may be determined by the user based on an actual application requirement, or may be preset by the voice assistant. In addition, for descriptions of the second application scenario and a specific implementation process of determining and displaying the common voice skill commands in the second application scenario, refer to the description of the first application scenario and the description of a specific implementation process of determining and displaying the common voice skill commands in the first application scenario in the foregoing content. Details are not described herein again.

It should be noted that the voice assistant automatically records a voice skill command entered by the user, a voice skill invoked by the voice skill command, time for invoking the voice skill by the voice skill command, and a current application environment, and stores the information in a historical voice skill usage record, to further improve practicability of the voice skill commands recommended by the voice assistant to the user.

In the voice interaction method provided in embodiments of this application, in response to the voice skill command entered by the user, the voice assistant may invoke the voice skill corresponding to the voice skill command. After the voice assistant fails to invoke the voice skill based on the voice skill command entered by the user, the voice assistant re-recommends voice skill commands to the user, and displays the voice skill commands in the display interface, so that the user can enter a voice skill command based on the voice skill commands recommended by the voice assistant, to invoke a corresponding voice skill. This enhances interaction experience between the user and the voice assistant, and reduces cases in which the voice assistant cannot recognize the voice skill command entered by the user or fails to invoke the voice skill command based on the voice skill command entered by the user.

In the conventional technology, voice interaction and a conventional touch operation are independent of each other, and the user may not specially invoke voice interaction to complete an operation. Therefore, to implement collaborative work of voice interaction and touch interaction, this application further provides a voice interaction method. After the voice assistant completes a corresponding operation based on the received voice skill command and obtains a feedback result, the user may share the feedback result with another application. The following describes the voice interaction method provided in embodiments of this application by using an example in which the voice assistant is displayed in half-screen mode and the voice assistant and another application are displayed in split-screen mode. In the half-screen mode of the voice assistant, a ratio of the display interface of the voice assistant to the entire display interface of the electronic device is greater than 0 and less than 1. As shown in FIG. 3(c), the method includes steps S305 and S306.

S305: The voice assistant displays the feedback result of the voice skill command in the display interface of the voice assistant.

The voice assistant invokes, based on the voice skill command entered by the user, the voice skill corresponding to the voice skill command, and obtains the feedback result of the voice skill command after completing the corresponding operation. Optionally, the voice assistant displays the obtained feedback result in a form of a card.

S306: The voice assistant shares the feedback result of the voice skill command with another application in response to an operation command of the user.

The operation command of the user includes a press operation and a drag operation.

Optionally, in response to the press operation performed by the user on a card that carries the feedback result, the voice assistant selects the card. Then, in response to the drag operation performed by the user on the card, the voice assistant drags the card to a user interface of the another application. After the user selects the card, the selected card is displayed in a floating mode. In addition, the card is displayed in the original location in a lighter color. The user needs to keep pressing until the card is dragged to another application interface to complete the sharing. If the user releases the card before dragging the card to the user interface of the another application, the card pops back, that is, the card is deselected, the display interface of the electronic device returns to the form existing before the card is selected, and the sharing fails. If the user drags the card to the user interface of the another application and releases the card, the sharing succeeds. A data form used when the card is shared to the another application is determined by a type of card content, for example, an image, text, or a link.

For example, the voice assistant is displayed in half-screen mode, the voice assistant and "Email" are displayed on the electronic device in split-screen mode, a ratio of the display interface of the voice assistant to a display interface of "Email" is 5:3, and the display interface of the voice assistant is on the upper of the display interface of "Email". After receiving the voice skill command entered by the user, for example, "How is the weather in Shanghai this weekend", the voice assistant invokes a corresponding voice skill based on the voice skill command "How is the weather in Shanghai this weekend", to complete a weather query operation, and obtain a feedback result. After the voice assistant receives the voice skill command entered by the user, the display interface of the electronic device is shown in FIG. 10(*a*). Refer to FIG. 10(*a*). A prompt picture shown in 1001 is a floating ball, and indicates that the voice assistant is in the sleep state and stops sound pickup. Prompt text shown in 1001 is feedback text "Sunny this weekend in Shanghai" obtained by the voice assistant after the voice assistant completes the weather query operation. Optionally, a card shown in 1002 is a feedback card obtained after the voice assistant completes the weather query operation, and the card includes detailed weather information of the Shanghai this weekend. Optionally, keywords shown in 1003 are common voice skill commands recommended by the voice assistant to the user, for example, "Will it rain today" or "Tomorrow's weather". If the feedback card shown in 1002 is pressed and held for preset duration, for example, 0.5 s, the display interface of the electronic device is shown in FIG. 10(*b*). Content shown in 1001, 1002, and 1003 in FIG. 10(*b*) is the same as content shown in 1001, 1002, and 1003 in FIG. 10(*a*). As shown in 1004, the original feedback card shown in the 1002 is scaled down in a specific proportion and floats, and the interface of "Email" is highlighted, to prompt the user to drag the floating feedback card to the display interface of "Email". After the user drags the feedback card for a specific distance, as shown in FIG. 10(*c*), a floating card shown in 1004 is not dragged to the display interface of "Email". In this case, if the user releases the hand, the sharing fails, and the floating card pops back. The display interface of the electronic device is shown in FIG. 10(*a*). If the user drags the floating card to the display interface of "Email", as shown in FIG. 10(*d*), the user releases the hand, and Shanghai weather information in the card may be shared to "Email" in a form of a picture. After the card content is successfully shared, the display interface of the electronic device is shown in FIG. 10(*a*). In this case, a display interface of "Email" is different from the display interface of "Email" before the sharing, and is not described herein again.

It should be noted that if the voice assistant is displayed in full-screen mode, that is, a ratio of the display interface of the voice assistant to the entire display interface of the electronic device is 1, or if the voice assistant is displayed on the display interface of the electronic device in floating mode, that is, the voice assistant is displayed in the display interface in a form of a floating ball (indicating that sound pickup is stopped) or a sound wave (indicating sound pickup), the user may share card content by pressing and holding a card and tapping an option that appears after the pressing and holding of the card. A data form used to share card content depends on a type of the card content, for example, a picture, text, or a link.

Figure 11A:
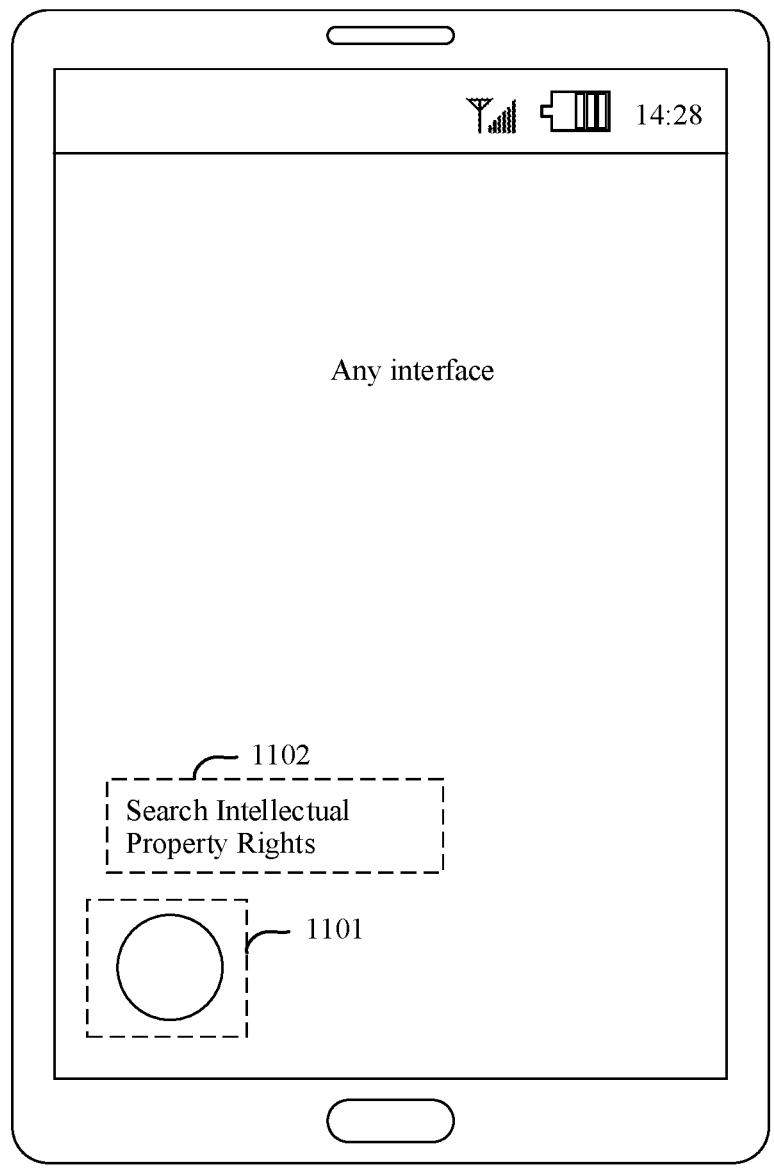
FIG. 11(a) to FIG. 11(c) are a schematic diagram 8 of displaying common voice skill commands according to an embodiment of this application.
Figure 11B:
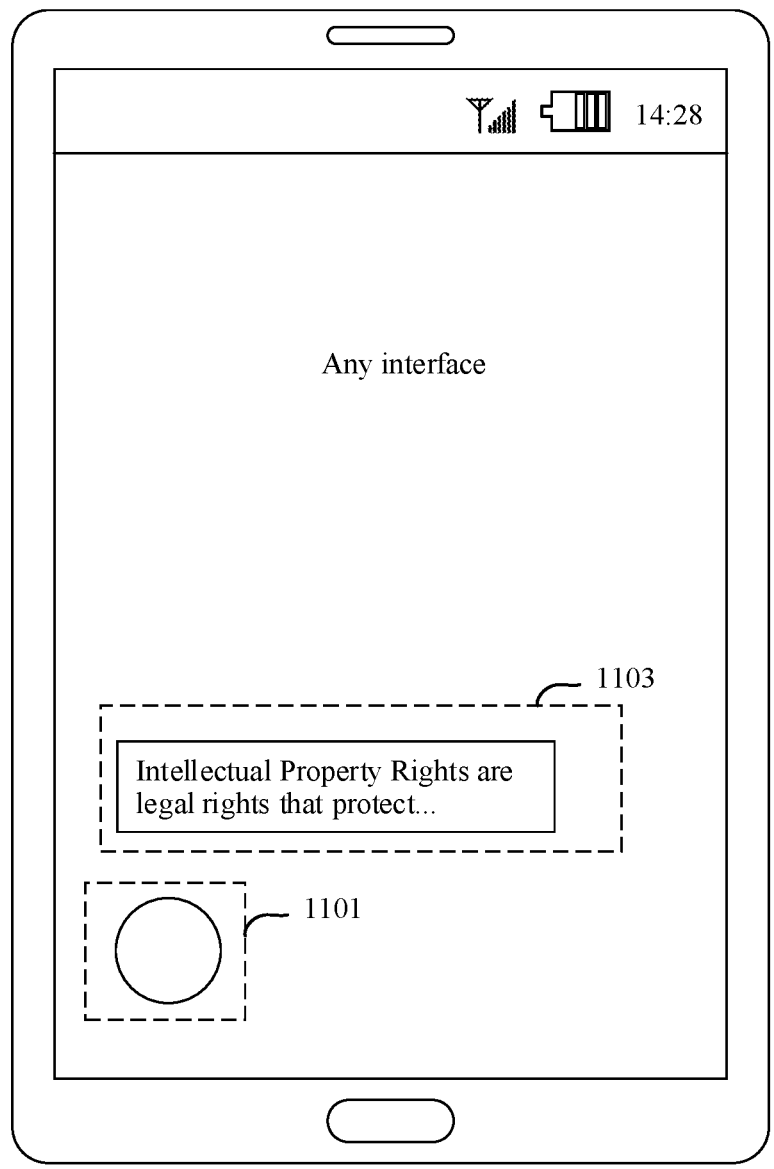
Figure 11C:
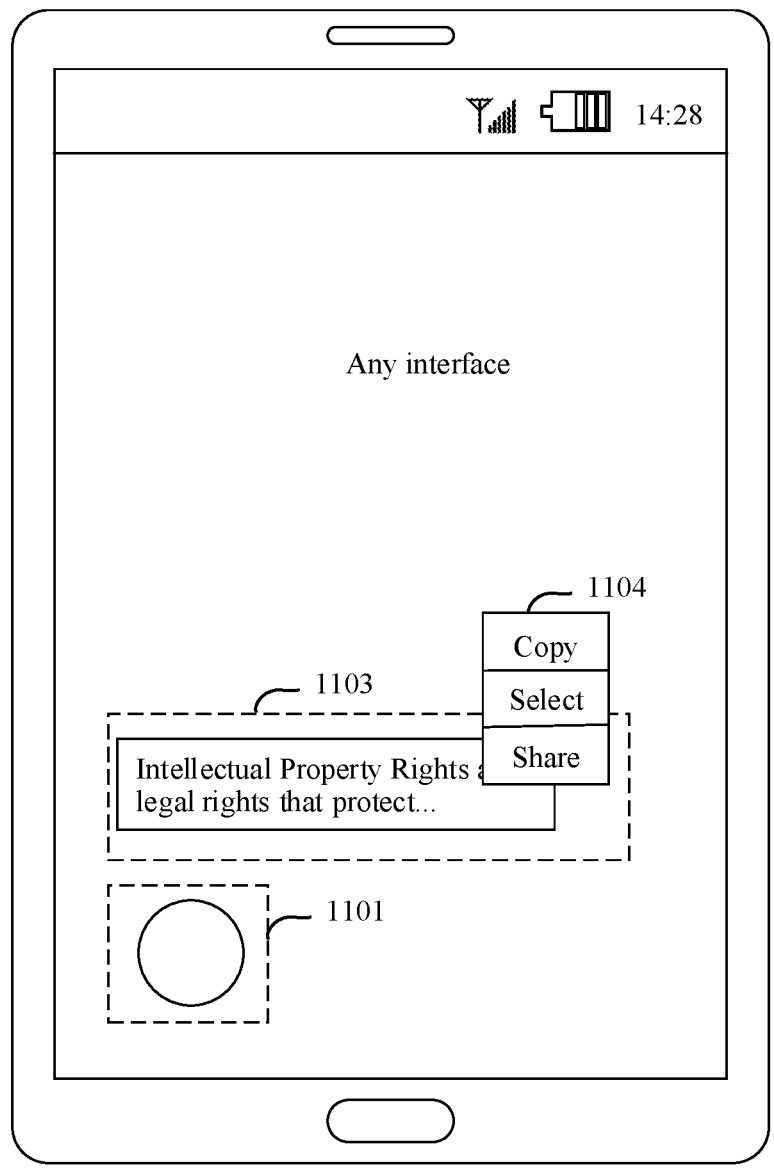

For example, the voice assistant is displayed in floating mode. After a voice skill command entered by the user is received, for example, "Search Intellectual Property Rights", the voice assistant invokes a corresponding voice skill based on the voice skill command "Search Intellectual Property Rights", to complete an operation of searching for description related to "Intellectual Property Rights", and obtains a feedback result. After the voice assistant receives the voice skill command entered by the user, the display interface of the electronic device is shown in FIG. 11(*a*). Refer to FIG. 11(*a*). The voice assistant is displayed in floating mode. A prompt picture shown in 1101 is a floating ball, and indicates that the voice assistant is in the sleep state and stops sound pickup. Prompt text shown in 1102, for example, "Search Intellectual Property Rights", indicates that the voice skill command entered by the user and received by the voice assistant is "Search Intellectual Property Rights", and then the voice assistant completes a corresponding search operation based on the voice skill command "Search Intellectual Property Rights". The display interface of the electronic device is shown in FIG. 11(*b*). Refer to FIG. 11(*b*). A prompt picture shown in 1101 is still a floating ball, and a card that includes feedback text and that is obtained after the voice assistant completes a search operation is shown in 1103. Optionally, the voice assistant plays, via voice, content "Intellectual Property Rights are legal rights that protect . . . " in the card shown in 1103. The card shown in 1103 is pressed and held (for example, pressed and held for 0.5 s), to pop up an option card, as shown in FIG. 11(*c*). Refer to FIG. 11(*c*). The option card shown in 1104 includes operations that the user may want to perform on the content in the card shown in 1103, for example, "Copy", "Select", and "Share". If the user taps the "Share" option in the option card shown in 1104, the voice assistant recommends, to the user, an application with which the card content can be shared, for example, "WeChat", "QQ", "Email". Then, with reference to the conventional technology, the user may choose, through touching and tapping, to share the card content with another application in a form of a link.

Certainly, the user may also directly deliver a voice skill command "Share a search result via WeChat" to the voice assistant, and share content through voice interaction between the voice assistant and the user.

According to the foregoing process, after the voice assistant invokes the voice skill and completes a corresponding operation, the user may perform an operation on the feedback content obtained by the voice assistant, and share the feedback content with another application, to implement collaborative work of voice interaction and touch interaction, and improve user experience.

In embodiments of this application, the foregoing terminal and the like may be divided into function modules based on the foregoing method examples. For example, each function module may be obtained through division for a corresponding function, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in an actual implementation.

Figure 12:
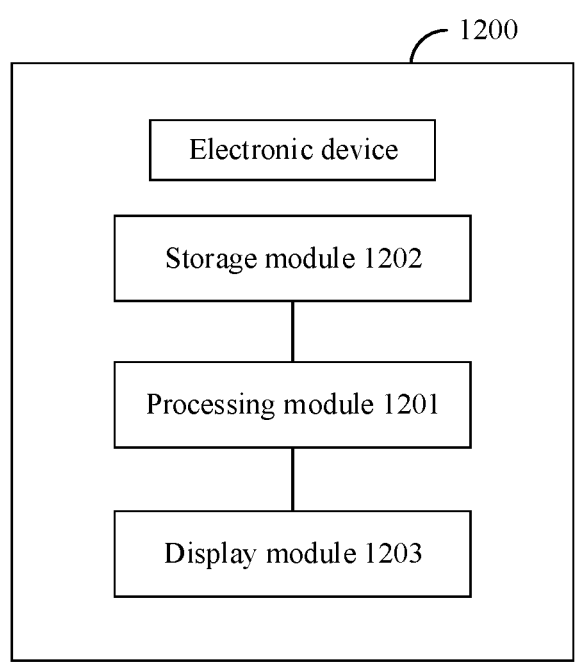
FIG. 12 is a schematic diagram 2 of a structure of an electronic device according to an embodiment of this application.

When an integrated unit is used, FIG. 12 is a possible schematic structural diagram of the electronic device in the foregoing embodiments. The electronic device 1200 includes a processing module 1201, a storage module 1202, and a display module 1203. The processing module 1201 is configured to control and manage an action of the electronic device 1200. The display module 1203 is configured to display an image generated by the processing module 1201. The storage module 1202 is configured to store program code and data of the terminal. For example, the storage module 1202 stores a preset wake-up word registered with the terminal and a first voiceprint model. The first voiceprint model is used to perform voiceprint verification when the voice assistant is to be woken up, and the first voiceprint model represents a voiceprint feature of the preset wake-up word. Optionally, the electronic device 1200 may further include a communications module, configured to support the terminal in communicating with another network entity. For detailed descriptions of the units included in the electronic device 1200, refer to the descriptions in the foregoing method embodiments. Details are not described herein again.

The processing module 1201 may be a processor or a controller, such as a central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processor may implement or execute various example logical blocks, modules, and circuits described with reference to content disclosed in this application. The processor may alternatively be a combination of processors implementing a computing function, for example, a combination of one or more microprocessors, or a combination of the DSP and a microprocessor. The communications module may be a transceiver, a transceiver circuit, a communications interface, or the like. The storage module 1202 may be a memory.

When the processing module 1201 is a processor (for example, the processor 110 shown in FIG. 1), the communications module includes a Wi-Fi module and a Bluetooth module (for example, the mobile communications module 150 and the wireless communications module 160 shown in FIG. 1). Communications modules such as the Wi-Fi module and the Bluetooth module may be collectively referred to as a communications interface. The storage module 1202 is a memory (for example, the internal memory 121 shown in FIG. 1 and an external SD card connected to the electronic device 1200 through the external memory interface 120). When the display module 1203 is a touchscreen (including the display 194 shown in FIG. 1), the terminal provided in this embodiment of this application may be the electronic device 100 shown in FIG. 1. The processor, the communications interface, the touchscreen, and the memory may be coupled together by using a bus.

Embodiments of this application further provide a chip system. The chip system includes at least one processor 1301 and at least one interface circuit 1302. The processor 1301 and the interface circuit 1302 may be interconnected through a line. For example, the interface circuit 1302 may be configured to receive a signal from another apparatus (for example, a memory of the electronic device 100). For another example, the interface circuit 1302 may be configured to send a signal to another apparatus (for example, the processor 1301). For example, the interface circuit 1302 may read instructions stored in the memory, and send the instructions to the processor 1301. When the instructions are executed by the processor 1301, the electronic device may be enabled to perform steps performed by the electronic device 100 (for example, the mobile phone) in the foregoing embodiments. Certainly, the chip system may further include another discrete component. This is not specifically limited in this embodiment of this application.

Embodiments of this application further provide a computer storage medium. The computer storage medium includes computer instructions. When the computer instructions are run on an electronic device, the electronic device is enabled to perform related method steps in any one of FIG. 3(a), FIG. 3(b), and FIG. 3(c), for example, S301, S302, S303, S304, S305, and S306, to implement the voice interaction method in the foregoing embodiments.

Embodiments of this application further provide a computer program product including instructions. When the computer program product is run on a computer, the computer is enabled to perform related method steps in FIG. 3(a), FIG. 3(b), and FIG. 3(c), for example, S301, S302, S303, S304, S305, and S306, to implement the voice interaction method in the foregoing embodiments.

Embodiments of this application further provide a voice interaction apparatus. The apparatus has a function of implementing behavior of the voice assistant in the electronic device in the foregoing methods. The function may be implemented by hardware, or may be implemented by hardware by executing corresponding software. The hardware or the software includes one or more modules corresponding to the foregoing function.

The electronic device, the computer storage medium, or the computer program product provided in embodiments of this application is configured to perform the corresponding method provided above. Therefore, for beneficial effects that can be achieved, refer to the beneficial effects in the corresponding method provided above. Details are not described herein again.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

All or some of the foregoing embodiments may be implemented by using software, hardware, firmware, or any combination thereof. When implemented by using a software program, the foregoing embodiments may appear in a form of a computer program product as a whole or in part, where the computer program product includes one or more computer instructions. When the computer program instructions are loaded and executed on a computer, all or some of the procedures or functions according to embodiments of this application are generated.

The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions about implementations allow a person skilled in the art to understand that, for the purpose of convenient and brief description, division into the foregoing function modules is used as an example for illustration. In actual application, the foregoing functions can be allocated to different function modules and implemented according to a requirement. That is, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, may be located in one place, or may be distributed on different places. In an application process, some or all of the units may be selected based on actual requirements to achieve the objectives of the solutions of embodiments.

In addition, function units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of the software functional unit and sold or used as an independent product, the integrated unit may be stored in a computer-readable storage medium. Based on such an understanding, the technical solutions of embodiments of this application essentially, or the part contributing to the conventional technology, some of the technical solutions may be implemented in the form of a software product. The computer software product is stored in a storage medium and includes several instructions for instructing a device (which may be a personal computer, a server, a network device, a single-chip microcomputer, or a chip) or a processor to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application.

What is claimed is:

1. A voice interaction method, used in an electronic device, wherein a voice assistant is installed on the electronic device, and the method comprises:
    after being woken up, determining, by the voice assistant, a first application scenario based on an information item, wherein the information item comprises a current display interface of the electronic device, a current moment, a current location of the electronic device, a current motion state of the electronic device, a current event, or an application currently running on the electronic device;
    determining, by the voice assistant, common voice skill commands in the first application scenario based on the first application scenario and a historical voice skill usage record, wherein a voice skill command is used to invoke a voice skill, the voice skill is a service provided by the voice assistant;
    determining, by the voice assistant, a priority sequence of the common voice skill commands in the first application scenario based on the first application scenario and the historical voice skill usage record; and
    displaying, by the voice assistant, the common voice skill commands in the first application scenario in a display interface according to the priority sequence.

2. The voice interaction method according to claim 1, wherein based on the voice assistant being woken up for a first time, the method further comprises:
    based on a current user being a new user, a network connection is normal, and the voice assistant can normally obtain high-frequency voice skill commands in a current network, displaying, by the voice assistant, the high-frequency voice skill commands in the display interface; and
    based on the current user being an old user, determining, by the voice assistant, common voice skill commands of the current user based on the historical voice skill usage record, and displaying, by the voice assistant, the common voice skill commands of the current user in the display interface.

3. The voice interaction method according to claim 1, wherein the determining the priority sequence of the common voice skill commands comprises:
    determining, by the voice assistant, an appearance frequency of common voice skills in the first application scenario based on the historical voice skill usage record and the first application scenario, wherein the common voice skills correspond to the common voice skill commands;
    determining, by the voice assistant, priorities of the common voice skills based on an appearance frequency of the common voice skill commands in the first application scenario; and
    determining, by the voice assistant, locations of the common voice skill commands in the display interface based on the priorities of the common voice skills.

4. The voice interaction method according to claim 1, wherein the method further comprises:
    in response to a voice skill command entered by a user, invoking, by the voice assistant, a voice skill corresponding to the voice skill command entered by the user.

5. The voice interaction method according to claim 1, wherein the method further comprises:

closing the voice assistant based on the voice assistant not receiving, within a second preset time period, a voice skill command entered by a user.

6. The voice interaction method according to claim 1, wherein the method further comprises:

based on a network connection being abnormal, notifying, by the voice assistant, a user that a network is abnormal.

7. The voice interaction method according to claim 1, wherein the common voice skill commands include one or more of:

a voice skill command used to invoke a voice skill corresponding to a clickable control in the display interface; or a voice skill command used to invoke a voice skill corresponding to recognizable text or a recognizable picture in the display interface; or a voice skill command used to invoke a voice skill corresponding to a recognizable scenario intention in the display interface; or a voice skill command used to invoke a voice skill corresponding to regular behavior that is based on the current moment; or a voice skill command used to invoke a voice skill corresponding to regular behavior that is based on the current location of the electronic device; or a voice skill command used to invoke a voice skill corresponding to regular behavior that is based on the current motion state of the electronic device; or a voice skill command used to invoke a voice skill corresponding to a native application; or a voice skill command used to invoke a voice skill corresponding to a third-party application; or a voice skill command used to invoke a voice skill corresponding to a preset event; or a voice skill command used to invoke a voice skill corresponding to an operation related to a plurality of applications; or a voice skill command used to invoke a voice skill corresponding to an operation with a long path; or a voice skill command used to invoke a voice skill corresponding to a function in the application currently running on the electronic device.

8. The voice interaction method according to of claim 1, wherein the voice assistant is displayed in a half-screen mode, wherein for the half-screen mode a ratio of an application interface of the voice assistant to an entire display interface of the electronic device is greater than 0 and less than 1, and the method comprises:

displaying, by the voice assistant, a feedback result of a voice skill command in a user interface of the voice assistant; and sharing, by the voice assistant, the feedback result of the voice skill command with another application in response to an operation command of the user.

9. The voice interaction method according to claim 1, wherein the historical voice skill usage record comprises a record and the record is used to indicate a time for invoking a voice skill, a voice skill command for invoking a voice skill, or an application scenario for invoking a voice skill.

10. An electronic device, wherein a voice assistant is installed on the electronic device, and the electronic device comprises a processor, a memory, and a display; the memory and the display are coupled to the processor; the display is configured to display an image generated by the processor; the memory is configured to store computer program code; and the computer program code comprises computer instructions, and when the processor executes the computer instructions, the processor is configured to:

after the voice assistant is woken up, determine a first application scenario based on an information item, wherein the information item comprises a current display interface of the electronic device, a current moment, a current location of the electronic device, a current motion state of the electronic device, a current event, or an application currently running on the electronic device;

determine common voice skill commands in the first application scenario based on the first application scenario and a historical voice skill usage record, wherein a voice skill command is used to invoke a voice skill, the voice skill is a service provided by the voice assistant;

determine, by the voice assistant, a priority sequence of the common voice skill commands in the first application scenario based on the first application scenario and the historical voice skill usage record; and display the common voice skill commands in the first application scenario in a display interface according to the priority sequence.

11. The electronic device according to claim 10, wherein based on the voice assistant being woken up for a first time, the processor is further configured to:

based on a current user being a new user, a network connection is normal, and the voice assistant can normally obtain high-frequency voice skill commands in a current network, display, by the voice assistant, the high-frequency voice skill commands in the display interface;

based on the current user being an old user, determine, by the voice assistant, common voice skill commands of the current user based on the historical voice skill usage record, and display, by the voice assistant, the common voice skill commands of the current user in the display interface.

12. The electronic device according to claim 10, wherein that the processor is configured to determine the priority sequence of the common voice skill commands in the first application scenario based on the first application scenario and the historical voice skill usage record, includes that the processor is configured to;

determine an appearance frequency of common voice skills in the first application scenario based on the historical voice skill usage record and the first application scenario, wherein the common voice skills correspond to the common voice skill commands;

determine priorities of the common voice skills based on an appearance frequency of the common voice skill commands in the first application scenario; and determine locations of the common voice skill commands in the display interface based on the priorities of the common voice skills.

13. The electronic device according to claim 10, wherein the processor is further configured to: in response to a voice skill command entered by a user, invoke a voice skill corresponding to the voice skill command entered by the user.

14. The electronic device according to claim 10, wherein the processor is further configured to close the voice assistant based on the voice assistant not receiving, within a second preset time period, a voice skill command entered by the user.

15. The electronic device according to claim 10, wherein the processor is further configured to: based on a network connection being abnormal, notify, by the voice assistant, a user that a network is abnormal.

16. The electronic device according to claim 10, wherein the common voice skill commands include one or more of:
- a voice skill command used to invoke a voice skill corresponding to a clickable control in the display interface; or
- a voice skill command used to invoke a voice skill corresponding to recognizable text or a recognizable picture in the display interface; or
- a voice skill command used to invoke a voice skill corresponding to a recognizable scenario intention in the display interface; or
- a voice skill command used to invoke a voice skill corresponding to regular behavior that is based on the current moment; or
- a voice skill command used to invoke a voice skill corresponding to regular behavior that is based on the current location of the electronic device; or
- a voice skill command used to invoke a voice skill corresponding to regular behavior that is based on the current motion state of the electronic device; or
- a voice skill command used to invoke a voice skill corresponding to a native application; or
- a voice skill command used to invoke a voice skill corresponding to a third-party application; or
- a voice skill command used to invoke a voice skill corresponding to a preset event; or
- a voice skill command used to invoke a voice skill corresponding to an operation related to a plurality of applications; or
- a voice skill command used to invoke a voice skill corresponding to an operation with a long path; or
- a voice skill command used to invoke a voice skill corresponding to a function in the application currently running on the electronic device.

17. The electronic device according to claim 10, wherein the voice assistant is displayed in half-screen mode, wherein for the half-screen mode a ratio of the application interface of the voice assistant to an entire display interface of the electronic device is greater than 0 and less than 1; and the processor is further configured to display a feedback result of a voice skill command in a user interface of the voice assistant, and share, by the voice assistant, the feedback result of the voice skill command with another application in response to an operation command of the user.

18. The electronic device according to claim 10, wherein the historical voice skill usage record comprises a record, and the record is used to indicate a time for invoking a voice skill, a voice skill command for invoking a voice skill, or an application scenario for invoking a voice skill.

19. A non-transitory readable medium comprising an instruction, which when executed by a processor causes the processor to perform a method of:
- after being woken up, determining, by a voice assistant, a first application scenario based on an information item, wherein the information item comprises a current display interface of an electronic device, a current moment, a current location of the electronic device, a current motion state of the electronic device, a current event, or an application currently running on the electronic device;
- determining, by the voice assistant, common voice skill commands in the first application scenario based on the first application scenario and a historical voice skill usage record, wherein a voice skill command is used to invoke a voice skill, the voice skill is a service provided by the voice assistant, the historical voice skill usage record comprises a record, and the record is used to indicate time for invoking a voice skill, a voice skill command for invoking a voice skill, and an application scenario for invoking a voice skill;
- determining, by the voice assistant, a priority sequence of the common voice skill commands in the first application scenario based on the first application scenario and the historical voice skill usage record; and
- displaying, by the voice assistant, the common voice skill commands in the first application scenario in a display interface according to the priority sequence.

20. The non-transitory readable medium according to claim 19, wherein the method further includes:
- based on a current user being a new user, a network connection is normal, and the voice assistant can normally obtain high-frequency voice skill commands in a current network, display, by the voice assistant, the high-frequency voice skill commands in the display interface;
- based on the current user being an old user, determine, by the voice assistant, common voice skill commands of the current user based on the historical voice skill usage record, and display, by the voice assistant, the common voice skill commands of the current user in the display interface.

* * * * *